(12) United States Patent
Martin et al.

(10) Patent No.: US 10,692,420 B2
(45) Date of Patent: Jun. 23, 2020

(54) DATA PROCESSING SYSTEMS

(71) Applicant: Arm Limited, Cambridge (GB)

(72) Inventors: Samuel Martin, Waterbeach (GB);
Metin Gokhan Unal, Gamston (GB);
Dantong Liu, Cambridge (GB)

(73) Assignee: Arm Limited, Cambridge (GB)

(*) Notice: Subject to any disclaimer, the term of this patent is extended or adjusted under 35 U.S.C. 154(b) by 28 days.

(21) Appl. No.: 16/130,565

(22) Filed: Sep. 13, 2018

(65) Prior Publication Data
US 2020/0090575 A1 Mar. 19, 2020

(51) Int. Cl.
| | |
|---|---|
| *G02B 27/01* | (2006.01) |
| *G06T 19/00* | (2011.01) |
| *G09G 3/20* | (2006.01) |
| *G06F 3/01* | (2006.01) |
| *H04N 13/398* | (2018.01) |

(52) U.S. Cl.
CPC ......... *G09G 3/2092* (2013.01); *G02B 27/017* (2013.01); *G06F 3/013* (2013.01); *G06T 19/006* (2013.01); *H04N 13/398* (2018.05); *G06T 2207/30168* (2013.01); *G09G 2320/06* (2013.01)

(58) Field of Classification Search
CPC ..... G02B 27/017; G06F 3/013; G06T 19/006; G06T 2207/30168; G09G 3/2092; G09G 2320/06; H04N 13/398
USPC ....................... 345/7, 8, 418, 419
See application file for complete search history.

(56) References Cited

U.S. PATENT DOCUMENTS

| | | |
|---|---|---|
| 5,841,439 A | 11/1998 | Pose |
| 2010/0091031 A1 | 4/2010 | Tsujimoto |
| 2011/0310102 A1 | 12/2011 | Chang |
| 2015/0379697 A1 | 12/2015 | Pohl |
| 2018/0253868 A1 | 9/2018 | Bratt |

OTHER PUBLICATIONS

Preliminary Amendment dated May 9, 2017, U.S. Appl. No. 15/446,997.
Office Action dated Oct. 3, 2017, U.S. Appl. No. 15/446,997.
Response to Office Action dated Apr. 2, 2018, U.S. Appl. No. 15/446,997.
Final Office Action dated Jun. 25, 2018, U.S. Appl. No. 15/446,997.

*Primary Examiner* — Jacinta M Crawford
(74) *Attorney, Agent, or Firm* — Vierra Magen Marcus LLP

(57) ABSTRACT

When displaying a frame that is to be transformed based on a predicted view orientation, the frame is transformed based on a predicted view orientation by, for each of plural different regions of the frame, determining a predicted view orientation transformation matrix to use to transform the region of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and then using the interpolated predicted view orientation transformation matrix determined for the region of the frame to transform the region of the frame. In this way each different region of the frame is subjected to a different predicted view orientation transformation.

26 Claims, 11 Drawing Sheets

DATA PROCESSING SYSTEMS

BACKGROUND

The technology described herein relates to data processing systems, and in particular to the operation of data processing systems that display images on a display.

FIG. 1 shows an exemplary data processing system 14 that comprises a host processor comprising a central processing unit (CPU) 7, a graphics processing unit (GPU) 2, a video codec 1, a camera 12, an image signal processor (ISP) 13, a display processor 5, and a memory controller 8. As shown in FIG. 1 these units communicate via an interconnect and have access to off-chip memory 3. In this system the GPU 2, video codec 1, ISP 13 and/or CPU 7 will generate frames (images) to be displayed and the display processor 5 will then provide the frames to a display 4 for display. The display 4 may be local or remote to the remainder of the system, and may have a wired or wireless connection to the display processor 5.

In use of this system, an application such as game executing on the host processor (CPU) will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display processor 5 will then read those frames into a buffer for the display from where they are then read out and displayed on the display panel of the display 4.

The frames for display may also or instead be streamed to the display processor from the processing unit, e.g. the GPU 2 or ISP 13, that is producing the frames, e.g. through a cache, if desired.

An example of a use of a data processing system 14 such as that illustrated in FIG. 1 is to provide a so-called "XR" display, such as an augmented reality (AR) and/or virtual reality (VR), head-mounted display (HMD) system. (In this case, the display 4 will be a head-mounted display of some kind.)

In a head-mounted AR/VR display operation, the appropriate images to be displayed to each eye will, e.g., be rendered by the graphics processing unit 2, in response to appropriate commands and data from the application, such as a game, (e.g. executing on the CPU 7) that requires the augmented reality or virtual reality display. The GPU 2 will, for example, render the images to be displayed at a rate that matches the refresh rate of the display, such as 30 frames per second.

In such arrangements, the system will also operate to track the movement of the head/gaze of the user (so-called head pose tracking). This head orientation (pose) data is then used to determine how the images should actually be displayed to the user for their current head position (view direction), and the images (frames) are rendered accordingly (for example by setting the camera (view point) orientation based on the head orientation data), so that an appropriate image based on the user's current direction of view can be displayed.

While it would be possible simply to determine the head orientation (pose) at the start of rendering a frame to be displayed in an AR/VR system, because of latencies in the rendering process, it can be the case that the user's head orientation (pose) has changed between the head orientation (pose) at the beginning of the rendering of the frame and the time when the frame is actually displayed (scanned out to the display panel).

To allow for this, frames to be displayed are rendered based on the head orientation data sensed at the beginning of the rendering of the frames, but then before the frames are actually displayed, the frames are re-projected based on an expected head orientation for the time that the frames will actually be displayed to the user. The expected head orientation may be, e.g., based on predicted head movements of the user between the time the frame is rendered and when it will actually be displayed. The re-projected version of the frame is then displayed. This allows the image displayed on the display to more closely match the user's (predicted) current head orientation.

To do this processing, the initial "application" frames are rendered into appropriate buffers in the memory but there is then a second rendering process that takes the initial, application frames in memory and uses the predicted head orientation (pose) information to render "re-projected" versions of the initially rendered frames that take account of the expected head orientation to provide the frames that will be displayed to the user. This typically involves some form of transformation on the frames, based on the predicted head orientation (pose). The so-transformed (re-projected) rendered frames that are actually to be displayed may then be written into a further buffer or buffers in memory from where they are then read out for display by the display processor, and/or streamed to the display processor directly for display.

The transformation (re-projection) of the initial frames based on the predicted head orientation (pose) may be carried out, e.g., by the graphics processing unit 2, and/or by the display processor 5 (where the display processor has appropriate transformation functionality), e.g. under appropriate control from the CPU 7. Thus, for this processing, the graphics processing unit 2 will render the "application" frames as required and instructed by the application, and then the graphics processing unit or the display processor, for example, will re-project those rendered frames appropriately based on predicted head orientation data for processing by the display processor 5 for display.

The Applicants believe that there is scope for improved arrangements for displaying images in head-mounted display systems, such as for augmented and/or virtual reality applications.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
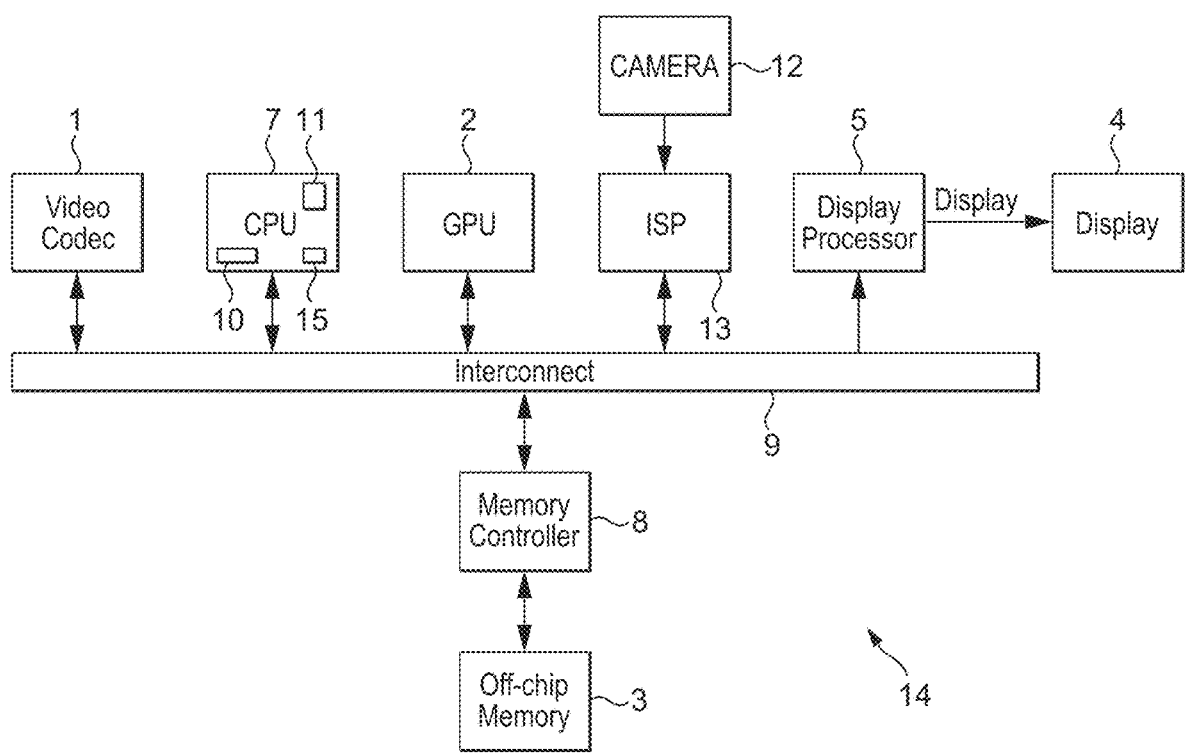
FIG. 1 shows an exemplary data processing system.

A first embodiment of the technology described herein comprises a method of operating a data processing system, the data processing system comprising:

a display operable to display frames for display;

a producer processing unit operable to generate frames for display on the display;

a display processor operable to provide frames generated by the producer processing unit to the display for display, the display processor comprising a transformation engine operable to transform a frame generated by the producer processing unit based on a view orientation to provide a view orientation transformed frame for display on the display;

the method comprising:

when displaying a frame generated by the producer processing unit that is to be transformed based on a predicted view orientation on the display:

the transformation engine transforming the frame for display on the display by, for each of plural different regions of the frame:

determining a predicted view orientation transformation matrix to use to transform the region of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and using the interpolated predicted view orientation transformation matrix determined for the region of the frame to transform the region of the frame to provide an output predicted view orientation transformed version of the region of the frame;

such that each different region of the frame is subjected to a different predicted view orientation transformation to the other regions of the frame for which an interpolated predicted view orientation matrix is determined.

A second embodiment of the technology described herein comprises a data processing system comprising:

a display operable to display frames for display;

a producer processing unit operable to generate frames for display on the display;

a display processor operable to provide frames generated by the producer processing unit to the display for display, the display processor comprising a transformation engine operable to transform a frame generated by the producer processing unit based on a view orientation to provide a view orientation transformed frame for display on the display;

wherein the transformation engine is configured to:

for a frame generated by the producer processing unit to be displayed on the display that is to be transformed based on a predicted view orientation:

for each of plural different regions of the frame:

determine a predicted view orientation transformation matrix to use to transform the region of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and use the interpolated predicted view orientation transformation matrix determined for the region of the frame to transform the region of the frame to provide an output predicted view orientation transformed version of the region of the frame;

such that each different region of the frame is subjected to a different predicted view orientation transformation to the other regions of the frame for which an interpolated predicted view orientation matrix is determined.

The technology described herein relates to the operation of data processing systems, and in particular to the operation of display processors in data processing systems when displaying images that are to be transformed based on predicted view orientations (such as will be the case, for example, in head-mounted display systems, such as, for example, for augmented reality or virtual reality applications).

In the technology described herein, when a frame to be displayed is to be transformed by the display processor based on a predicted view orientation, rather than simply transforming the frame to be displayed as a whole (e.g. based on a predicted view orientation for the frame as a whole), respective regions within a frame are transformed based on their own, separate, predicted view orientation-based transformations.

This then has the effect of the predicted view orientation-based transformation taking account of the fact that regions of a frame will be displayed on the display at different times (as the frame is scanned out to the display). In other words, by transforming each frame region individually based on a predicted view orientation for that region, the particular time of display of the different regions can be (and is) allowed for and taken account of.

This can then provide a more accurate and visually acceptable display, particularly in the case of a head-mounted display where the user is moving during display of the frames.

Furthermore, the predicted view orientation transformations for the different regions within the frame are performed using predicted view orientation transformation matrices that are interpolated from predicted view orientation transformation matrices that correspond to predicted view orientations at respective first (earlier) and second (later) times during the display of the frame (e.g., and in an embodiment, at the start and end times of the display of the frame).

Because the different view orientation transformations to be applied within the frame are determined by interpolating view orientation transformation matrices that are defined for particular points (times) during the frame display (scan out), that reduces the amount of computation that is required when providing the "bespoke" predicted view orientation transformations for respective regions within the frame.

Furthermore, and as will be discussed further below, the Applicants have recognised that this also allows this calculation to be performed during respective blanking periods during the display scan out, thereby allowing this operation to be performed at an appropriate rate for displaying the frame in a real time, and also using display processor hardware that would otherwise be idle during the blanking period (such that existing display processor hardware can be reused for the matrix interpolation without affecting the overall operation of displaying the frame (and accordingly without the need to provide additional hardware elements within the display processor for that purpose)).

The display in the technology described herein can be any suitable and desired form of display, and can comprise any suitable and desired components and elements that a display may comprise, such as, and in an embodiment, a display panel, a display driver circuit for scanning frame data to the display panel, and a display receiver for receiving data to be displayed on the display panel. The display may also comprise appropriate local (on-chip) frame data storage, such as a frame buffer.

The producer processing unit that generates the frame for displaying on the display can comprise any processing unit of data processing system that is capable of generating frames for display. Thus it may comprise, for example, a graphics processor (graphics processing unit (GPU)), a video processor, a CPU, and/or an image signal processor (ISP), etc. There may be more than one producer processing unit operable to generate frames for display on the display, if desired. In an embodiment, the producer processing unit is a graphics processor.

Thus the frames for display are in an embodiment generated (rendered) by a graphics processing unit (a graphics processor) of the data processing system, but they could also instead be generated or provided by another component or components of the overall data processing system, such as a CPU, a video processor, or an ISP, if desired.

The frames that are generated for display can be any suitable and desired frames that it may be desirable to display. In an embodiment, the frames are frames that are generated for display for an application, such as a game, and in an embodiment for an augmented reality or virtual reality application.

The frames that are generated for display may comprise, for example, perspective images (so-called "projection" layers), such as stereo-perspective images. Such images will typically rendered by a GPU. The frames may also or instead comprise (regular) 2D images (so-called "quad" layers), such as flat images or video on a flat 3D quadrilateral in a 3D coordinate system (for example, a video on a rectangular cinema screen can be represented by a quad layer).

Each frame will comprise an array of data elements (sampling positions) (e.g. pixels), for each of which appropriate data (e.g. a set of colour values) is stored.

The display processor can comprise any suitable and desired display processor that is operable to provide frames generated by a producer processing unit of the data processing system to the display for display. Thus the display processor should be operable to read data of frames from memory, perform appropriate "display processing" on those frames, and then provide the processed frames to the display for display. In an embodiment, the display processor provides the frames to the display for display via a "direct" connection to the display, i.e. is operable to stream the frames (the data for the frames) to the display, rather than transferring the frames to the display via memory for example. The display processor may have a wired or wireless connection to the display.

The display processor may also be operable to perform other processing operations on frames for display (as well as the operations necessary to provide the frames in a form suitable for display), such as compositing plural input frames to provide an output frame for display, etc. For example, the display processor may operate to composite one or more predicted view orientation transformed "projection" layers and/or one or more predicted view orientation transformed "quad" layers to provide an overall predicted view orientation transformed output frame for display.

In one embodiment, the frames generated by the producer processing unit are stored, e.g. in a frame buffer, in memory, from where they are then read by the display processor for processing by the display processor (and then providing to the display for display).

The memory where the frames are stored (prior to processing by the display processor) may comprise any suitable memory and may be configured in any suitable and desired manner. For example, it may be a memory that is on-chip with the display processor, or it may be an external memory. In an embodiment it is in external memory, such as a main memory of the overall data processing system. It may be dedicated memory for this purpose, or it may be part of a memory that is used for other data as well.

In another embodiment, the frames are streamed to the display processor (without intermediate storage in memory).

The display processor includes a transformation engine that is operable to transform frames for display based on a predicted view orientation.

More particularly, the transformation operates to transform frames for display based on a predicted view orientation, by transforming respective regions within a frame to be displayed using a particular, determined, predicted view orientation transformation for the region in question. The predicted view orientation that a frame region is transformed based on is in an embodiment a desired view orientation (view position and/or direction) that the frame region in question is to be displayed as if viewed from (that the frame region that is to transformed is to be displayed with respect to).

The regions that a frame to be transformed is divided into in this regard can be selected as desired. Each region in an embodiment comprises a contiguous region of the frame, such that the frame will be divided (for transformation and display purposes) effectively into a plurality of successive regions, with each region in the sequence then being subjected to its own predicted view orientation transformation.

In an embodiment, each region that the frame is divided into is the same size and configuration. In an embodiment each region contains a particular, in an embodiment selected, in an embodiment predetermined (and in an embodiment the same) number of integer (whole) display scan lines (rows or columns, depending upon the display scan-out configuration). In an embodiment, each region will accordingly comprise n scan lines, such that a first set of n scan lines of the display will be subjected to a first predicted view orientation transformation, a second set of n scan lines of the display will be subjected to a second, different predicted view orientation transformation, and so on (where the frame is divided into more than two sets of n scan lines). The regions in these arrangements could comprise any suitable and desired number of scan lines, such as a single scan line or more than one scan line.

In an embodiment, each region comprises a single (and complete) scan line. Thus, in this case, the predicted view orientation transformation for a frame will be performed by (and the transformation engine will be configured accordingly), for each scan line of the frame:

determining a predicted view orientation transformation matrix to use to transform the scan line of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and use the interpolated predicted view orientation transformation matrix determined for the scan line of the frame to transform the scan line of the frame to provide an output predicted view orientation transformed version of the scan line of the frame.

In the technology described herein, the predicted view orientation that is used when transforming a frame region (e.g. scan line) is determined as a predicted view orientation matrix that is interpolated from a first predicted view orientation matrix that corresponds to a predicted view orientation for a first time when displaying a frame, and a second predicted view orientation matrix that corresponds to a second predicted view orientation for a later time during the display of the frame.

The first and second times during the display of the frame for which the first and second predicted view orientation matrices are derived can comprise any suitable and desired (spaced apart) times during the display of the frame. In one embodiment, the first time corresponds to the (predicted) start time of the display of the frame (i.e. the time at which it is predicted when the transformed frame will start to be scanned out on to the display panel), with the second time then being a predicted time for later in the display of the frame, such as, and in an embodiment, a predicted view orientation for the time when it is predicted that the display scan out will finish (when the last pixel for the frame will be scanned to the display panel).

It would also be possible to determine predicted view orientations for other and/or additional times during the display of a frame, if desired. Embodiments in which this is done will be discussed further below.

In an embodiment, the predicted view orientation for a given time "point" is based on received view orientation data that indicates a "current" view orientation for the display. In an embodiment, this current view orientation data comprises head pose tracking data that, e.g., and in an embodiment, has been sensed from appropriate head pose tracking sensors of a display headset that the display is part of (and that the frames are to be displayed on).

Thus, in an embodiment, the transformations based on predicted view orientations for the first and second times during the display of the frame are based on and use appropriately sampled head pose tracking data that is, e.g., and in an embodiment, periodically determined by a headset that the display is part of.

Thus, in an embodiment, the technology described herein comprises (and the data processing system is appropriately configured to) periodically sampling view orientation data (e.g. head pose data) (e.g., and in an embodiment, by means of appropriate sensors of a head-mounted display that the display is part of), and periodically providing sampled view orientation data and using the provided sampled view orientation data when transforming a frame to provide a transformed version of the frame for display.

The head pose tracking data that is sampled and used in this regard can comprise any suitable and desired head pose tracking data. In an embodiment, it is data that is indicative of a view direction and/or position (and in an embodiment both), and in an embodiment tracks one or more of, and in an embodiment all of: head rotation and head translation.

The head pose tracking data can be determined as desired. For example, it could be generated by an appropriate sensor, such as an inertial measurement unit (IMU) that is associated with the display, tracking system or a camera of the data processing system. In general, the sensed head pose data can be, and is in an embodiment, provided by a suitable system that can be queried at any point for a low latency, high accuracy source of head pose (in an embodiment rotation and position) data. The head pose tracking system could track rotation only, or rotation and position, or rotation and position and velocity, etc., as desired.

The predicted view orientation for a given time point during the display of a frame and that the frame is transformed based on could comprise a predicted view position and/or a predicted view direction. In an embodiment, it comprises both a predicted view position and a predicted view direction.

In an embodiment, the sampled view orientation (e.g. head position and/or direction) is used together with information about the time when the frame will be displayed (e.g. the estimated start and end times for the display of the frame), to predict respective view orientations (e.g., and in an embodiment, view positions and/or directions) for the user at the first and second times during actual display of the frame, with the respective first and second transformations then being respectively based on their respective predicted view orientations.

Thus, in an embodiment, a sensed view orientation (head pose) is used to predict a future view orientation for the frame at the first and second times (time points) during the display of the frame, based on the sensed view orientation and the time at which the view orientation was sensed and the times that the predicted view orientation are to be determined for. This prediction in an embodiment uses an estimate of the likely motion (e.g. rotation and/or translation) of the user's gaze from the time where the view orientation has been sampled to the time that transformation is being determined for.

In an embodiment, the prediction uses one or more of, and in an embodiment all of: rotation, translation, and estimated display time, to determine the predicted view orientation for the display time in question.

Thus, in an embodiment, the predicted view orientations for the first and second times are determined based on a sensed, in an embodiment current, view orientation (position and/or direction), and a prediction of the user's likely head movement (e.g., and in an embodiment, rotation and/or translation) from that sensed view orientation to the first and second times, respectively, to provide respective predicted view orientations for the first and second times when the frame will be displayed.

The predicted head movement between the sensed orientation (head pose) and the time for which the predicted view orientation is required can correspondingly be determined in any suitable and appropriate manner, for example, and in an embodiment, by tracking the user's head movement (e.g., and in an embodiment, rotation and/or translation and/or velocity) over a period of time, and using that tracking to then predict future head movement of the user.

Other arrangements would, of course, be possible.

In an embodiment, the producer processing unit is configured to generate a frame for display based on a currently sensed view orientation, with the transformation engine then transforming the frame that is rendered based on the sensed view orientation to new, predicted, view orientations based on the time(s) when the frame will be displayed.

The actual determination of the predicted view orientation using the sensed head pose data can be performed in any suitable and desired component or element of the data processing system. Thus it may, for example, be generated in a suitable processor, such as a CPU, or other processor, of the data processing system.

Thus, in an embodiment, the data processing system further comprises a predicted view orientation generating engine that is operable to generate predicted view orientations (predicted view orientation parameters) from one or more of, and in an embodiment all of: a sensed (current) view orientation (direction and/or position); a previously estimated display time (the time that the frame to be transformed was generated for); and two or more target display times for the frame (i.e. during when the frame is intended to be displayed)).

This engine in an embodiment then returns the necessary predicted view orientation parameters to be used to determine the transformations to be used to transform the frame in question based on the predicted view orientations. This engine could, e.g., be part of CPU or other processor of the system, a standalone processor (engine) of the system, and/or associated with the display processor, etc. It is in an embodiment part of a driver for the display processor, e.g., and in an embodiment, that executes on a CPU (e.g. host processor) of the data processing system.

The determined predicted view orientations are in an embodiment then used to determine appropriate predicted view orientation transformations for the transformation engine, which transformations should then be appropriately provided to the transformation engine.

In the technology described herein, the transformations based on predicted view orientations are performed using transformation matrices. Thus, the determined predicted view orientations are used to determine appropriate predicted view orientation transformation matrices for the transformation engine, which transformation matrices should then be appropriately provided to the transformation engine.

These transformation matrices can take any suitable and desired form that would be operable to perform the appropriate transformation to re-project the frame (and a frame region) from the view orientation that the frame region has been generated with respect to, to the desired predicted view orientation that it is to be displayed with respect to. Thus, for example, the matrices should, and in an embodiment do, perform rotational reprojection of perspective images and regular 2D images into a virtual perspective camera via a homography.

In an embodiment, the transformation matrices that are used in the technology described herein comprise homogeneous 3×3 matrices.

Such matrices can be derived in any suitable and desired manner, and this may, for example, depend upon the nature of the frame that is to be transformed.

For example, in the case of frame comprising a perspective image (a "projection layer"), e.g. that has been rendered by a GPU, the perspective content that such a frame contains will be described by the 3D camera and perspective projection used by the camera. In this case, the transformation from 3D scene to 2D perspective image can be represented by a 4×4 perspective transformation matrix.

However, as the camera and perspective used may not directly match the form factor and optics of the display headset, the (perspective) view seen by a human eye in the headset is in an embodiment also described by a similar description of the eye's 'camera' relative to a reference origin, and correspondingly represented by a 4×4 perspective transformation matrix.

Then, using 4×4 homogenous matrix transformations, the application-specified transformation, A, and the desired display transformation, B, both relative to a canonical reference orientation, and a rotational delta between the predicted and actual head pose, are in an embodiment composed to give a transform from the output display coordinates to the input image (frame) coordinates:

$$\text{image\_coords} = [A.R.\text{inverse}(B)] \cdot \text{display\_coords}$$

Furthermore, as the transformation in square brackets is a 4×4 homogeneous perspective matrix, that can be, and is in an embodiment, reduced to a 3×3 matrix as one row and column are redundant and may be collapsed.

On the other hand, in the case of a frame comprising a regular 2D image (a "non-perspective image") (a "quad layer"), as such an image (frame) will not have an application-specified perspective projection associated with it, the transformation should operate to perform a 2D mapping that places the image on the display as if it was being seen as a 3D surface through a perspective camera.

In this case, an affine transform of a canonical quadrilateral (e.g. a unit square at the origin) to the desired size, orientation and location in 3D space is in an embodiment derived and/or provided (e.g. by the application that requires the display), and then, using a description of the perspective camera in the headset, a homography that maps from the 2D display plane to the 2D image plane and produces this effect is derived. Homographs of this form are all 3×3 (2D homogeneous) matrices. Such a homography can be found from 4 pairs of point correspondences using a least-squares approach, or using a direct mapping, for example.

(It should also be noted here that using this "Quad layer" homography-based approach allows for arbitrary 6-degrees-of-freedom (6-dof) reprojection for "quad" layers, not just 3-dof rotational reprojection.)

Thus, both layer types can be and are in an embodiment, encoded as 3×3 matrices, e.g., and in an embodiment by mapping between such a matrix representation and application-facing API descriptions.

The actual generation of the predicted view orientation transformation matrices can be performed in any suitable and desired component or element of the data processing system. Thus it may, for example, be generated in a suitable processor, such as a CPU, or other processor, of the data processing system.

Thus, in an embodiment, the data processing system further comprises a predicted view orientation transformation matrix generating engine that is operable to generate predicted view orientation transformation matrices using, inter alia, received predicted view orientation parameters.

This engine in an embodiment then returns the necessary predicted view orientation transformation matrices to be used to transform the frame in question based on the predicted view orientations. This engine could, e.g., be part of CPU or other processor of the system and/or a standalone processor (engine) of the system, etc. It is in an embodiment part of a driver for the display processor, e.g., and in an embodiment, that executes on a CPU (e.g. host processor) of the data processing system. Thus, in an embodiment, the driver for the display processor generates the (first and second) predicted view orientation transformation matrices that are used in the technology described herein.

Once the first predicted view orientation transformation matrix (corresponding to a predicted view orientation transformation for a first time during the display of the frame), and the second predicted view orientation transformation matrix (corresponding to a second, later time during the display of the frame) for the frame to be displayed have been derived, e.g. by the driver for the display processor, those matrices can then be, and are in an embodiment, provided to the display processor (to the transformation engine of the display processor) for use when transforming the frame to be displayed for respective predicted view orientations.

The display processor (the transformation engine) of the display processor can then use the provided matrices to derive predicted view orientation transformation matrices to use for respective regions of the frame as the frame is being displayed. For a (and each) region, in an embodiment the transformation engine derives the interpolated matrix values before transforming the region.

As discussed above, for each respective region during the display of the frame, the transformation engine will use the provided first and second predicted view orientation transformation matrices to derive a predicted view orientation transformation matrix to use for the frame region in question. Moreover, the transformation engine does this by interpolating between the first and second predicted view orientation matrices to determine the predicted view orientation matrix to use for a given region of the frame.

In an embodiment, linear interpolation is used for this purpose. Thus, in an embodiment, the transformation matrix to use for a given frame region is linearly interpolated from the provided first and second predicted view orientation matrices, in accordance with and depending upon the display time for the frame region in question relative to the time (points) (e.g. the start and end frame of the frame) that the first and second predicted view orientation transformation matrices have been derived for.

In an embodiment, the relative position of the frame region in question in the frame (to the positions in the frame for which the first and second predicted view orientation matrices have been derived) is used as a measure of the display time for that frame region relative to the time (points) that the first and second predicted view orientation transformation matrices have been derived for. Thus, the relative position of the frame region in question is in an embodiment used as a weight factor between the first and second predicted view orientation matrices to weight in an appropriate manner the contribution of those matrices to the transformation matrix that will be used for the frame region in question.

Thus a frame region's transformation matrix is in an embodiment determined by interpolating between the provided first and second predicted view orientation matrices using a weight factor that is based on the relative position of the frame region between the positions in the frame for which the first and second predicted view orientation matrices have been derived.

It would be possible in this regard to determine the interpolation weight factor directly based on the relative position of a frame region. On the other hand, where, for example, the output frame is scanned out sequentially by the display processor, then the interpolation weight factor for each region could be determined by adding an appropriate increment to the interpolation weight factor for the previous frame region, if desired. In this case, the interpolation weight factor for each successive frame region will be determined by adding an appropriate increment to the interpolation weight factor used for the previous frame region.

The interpolation of the provided first and second predicted view orientation transformation matrices to provide the predicted view orientation transformation matrix to use for a frame region can be determined at any appropriate and desired time during the displaying of the frame. In an embodiment, this is done using the blanking period at the end of a scan line. Indeed, the Applicants have recognised that the operation in the manner of the technology described herein can be performed using the blanking period at the end of scan lines, thereby facilitating performing the matrix interpolation and the operation in the manner of the technology described herein without otherwise delaying the scan out of the frame. This can also allow the matrix interpolation to be performed reusing hardware that would be used for other purposes, such as, and in an embodiment, the hardware that performs per pixel matrix multiplication normally (as that hardware will otherwise be idle during the blanking period).

Thus, in an embodiment, where the frame regions that are being processed in the manner of the technology described herein correspond to scan lines of the frame being displayed, the interpolated transformation matrix to use for a scan line is in an embodiment determined during the blanking period at the end of a (or the) preceding scan line.

A new pair of predicted view orientation matrices is in an embodiment provided for each frame that is to be displayed, in an embodiment at the beginning of each frame. The predicted view orientation matrices for a frame are in an embodiment based on the latest sampled view orientation data (where available).

It would be possible to provide only one pair of first and second predicted view orientation transformation matrices for a frame, from which all the transformation matrices to be used for the regions within the frame are interpolated (and in one embodiment, this is what is done). In this case, the two predicted view orientation transformation matrices that are provided in an embodiment comprise a matrix corresponding to a predicted view orientation for the start of the frame and a matrix corresponding to a predicted view orientation for the end of the frame.

However, if view orientation information (e.g. sensed view orientation data) is available during the display of the frame (or at least closer in time to the display of the frame), then it would be possible to provide updated predicted view orientation transformation matrices for use for the interpolation process during the display of a frame. This may allow the transformation of the frame regions based on predicted view orientations to more closely match the user's actual view orientation at the time that the frame region is displayed.

Thus, in an embodiment, the operation in the manner of the technology described herein comprises providing a first pair of first and second view orientation transformation matrices to be used to interpolate predicted view orientation transformation matrices initially when a frame is to be rendered, but then providing one or more further (and updated) predicted view orientation transformation matrices for use whilst the frame is being displayed, with the transformation engine then using the later, updated, predicted view orientation transformation matrix or matrices to interpolate between.

This will then allow "sub-frame" corrections (updates) to the predicted view orientation matrices, thereby facilitating closer approximation to the user's actual view orientation.

In this case, a single further, updated view orientation transformation matrix could be provided, e.g. for interpolating with the already provided first predicted view orientation matrix, but in an embodiment, a pair of new, updated, predicted view orientation matrices to be used for the interpolation process are provided.

In this case, the predicted view orientation matrices in the new pair of predicted view orientation matrices in an embodiment comprise a first new predicted view orientation matrix of the pair that corresponds to a transformation for a predicted view orientation for a given time during the display of the frame (that is in an embodiment later than the start of the frame), and a second new predicted view orientation matrix that corresponds to a predicted view orientation for a second, later time during the display of the frame (and in an embodiment corresponding to a predicted end time for the display of the frame).

In an embodiment, the second (later) updated predicted view orientation matrix (e.g. predicted end time view orientation matrix) is an updated matrix that has been updated using more recent (in an embodiment the latest) head pose tracking sensor readings (and more accurate prediction), with the first updated, new predicted view orientation matrix of the pair then in an embodiment being an updated matrix that has been adjusted to provide a smooth transition from the current re-projection to the updated one (as will be discussed further below).

This may then be repeated by providing further new, updated pairs of view orientation transformation matrices for interpolating between, if desired, e.g., and in an embodiment, as new sensed view orientation data becomes available.

In this case therefore, when displaying a frame, the transformation engine for the display processor will initially be provided with a first pair of first and second view orientation transformation matrices based on a first sensed current view orientation of the user, but then, e.g. during display of the frame, will be provided with one or more subsequent pairs of first and second predicted view orientation transformation matrices for interpolating between to use for the frame, based on respective sets of later sensed view orientation data for the user.

In these arrangements, new, updated, pairs of predicted view orientation transformation matrices can be provided to be used at any desired intervals during the display of the frame, such as for use for every particular fraction (e.g. half, third or quarter) of the frame, every particular number of scan lines of the frame, etc. This may depend, for example, upon how frequently the user's current view orientation is sensed.

Where a new view predicted orientation matrix or a pair of new predicted view orientation matrices are provided for use during the displaying of a frame, then in an embodiment, the new predicted view orientation matrix or matrices is associated with an indication of when during the display of the frame, that matrix or pair of matrices is valid for (is to start being used). This is in an embodiment indicated in terms of the scan line of the frame for which the new matrix or pair of matrices is valid (is to be used for). Then, when the display processor reaches the indicated time (e.g. scan line) during the display of the frame, it will switch to using the new predicted view orientation matrix or pair of matrices for the matrix interpolation. (The initial pair of matrices can be allocated an indication of "0" if desired to trigger their use from the start of the frame.)

In these arrangements, the new predicted view orientation matrix or pair of predicted view orientation matrices are in an embodiment configured (set) so that at the time when that matrix or matrices starts to be used, they will produce the same resultant interpolated predicted view orientation matrix for the frame region in question as would be produced by the interpolation of the previous predicted view orientation matrix or pair of view orientation matrices (that are being replaced). In an embodiment the "start" matrix for a new, updated predicted view orientation matrix pair is set such that the interpolated matrix values at the time (for the region) when the updated pair of matrices start to be used will be equal to the interpolated matrix values for that region derived using the previous (e.g. initial) pair of predicted view orientation matrices.

This will then facilitate a smoother display (e.g. avoiding any discontinuity in the displayed frame) when the switch to using a new predicted view orientation matrix or matrix pair is performed. This can be achieved in any suitable and desired manner.

Once the interpolated predicted view orientation matrix for a frame region has been derived, the transformation engine applies that matrix to the frame region to transform the frame region based on a predicted view orientation for that particular frame region.

This will, and in an embodiment does, as discussed above, transform the frame region to provide a representation of the frame region as if viewed from the predicted view orientation (view direction and/or position) (as compared, e.g., to the view orientation (view direction and/or position) that the frame was generated (rendered) with respect to by the producer processing unit). Thus, in an embodiment, the transformation engine operates to re-project the frame regions from the view orientation that they were produced with respect to, to their respective predicted view orientations.

The transformation engine may be implemented in any suitable and desired manner. It is in an embodiment provided by suitable processing circuitry (a suitable processing circuit). It may be provided, for example, by means of suitable programmable processing circuitry that can be programmed to operate in the desired manner, or provided as fixed function processing circuitry that is configured to perform in a required processing operation. Where fixed-function circuitry is used to perform the transformation operation, then that fixed-function circuitry is in an embodiment arranged to have limited configurability in use, such as it being possible to vary one or more control parameters for the operation that the circuitry performs, so as to facilitate some variation in the configuration of the operation of the fixed-function circuitry.

The transformation engine can be implemented and provided as desired in the display processor. Thus it may be provided as a "standalone" transformation engine (transformation processor) of the display processor.

In an embodiment, the transformation engine is provided, and the predicted view orientation-based transformations are performed, as part of the display processing that is performed by the display processor when processing a frame for providing to the display.

In this case, the predicted view orientation-based transformations could be performed as a separate step in the display processor, but in an embodiment, they are performed as part of other display processing steps in the display processor. For example, where the display processor is already operable to perform chromatic aberration correction on frames to be displayed, then the predicted view orientation transformations in the manner of the technology described herein could be, and is in an embodiment, performed in combination with (in conjunction with) the chromatic aberration correction.

Thus, in an embodiment, the predicted view orientation transformation in the manner of the technology described herein is implemented as part of the display processor processing operation, and in an embodiment as part of or in conjunction with other display processor processing operations, such as, and in an embodiment, chromatic aberration correction and/or lens distortion correction.

Correspondingly, in an embodiment, the transformation engine is operable to, and operates to, transform a (and each) region to be displayed on the display for a frame based on both an interpolated predicted view orientation matrix for that frame region, and one or more other criteria (parameters), such as, and in an embodiment, one or more of, and in an embodiment all of: a chromatic aberration correction and a lens distortion correction.

The transformation engine in an embodiment operates to produce the output, predicted view orientation transformed frame regions on a sampling position-by-sampling position (e.g. pixel-by-pixel) basis, i.e. as a stream of predicted view orientation transformed sampling positions (pixels) (sampling position (pixel) values). This is in an embodiment done by the transformation engine generating the output predicted view orientation transformed frame region by generating the data values for respective sampling positions (e.g. pixels) in the output predicted view orientation transformed frame region from the data values for sampling positions (e.g. pixels) in the input frame.

In an embodiment, the transformation engine transforms a (and each) frame region by determining for a display data element (pixel) position in the frame region to be displayed, the corresponding position (coordinate) in the frame from which the data for that data element (pixel) position in the transformed output frame region should be taken.

In other words, the transformation engine in an embodiment determines the position in the input frame that will be moved to a given data element (pixel) position in the predicted view orientation transformed frame region by the transformation that the transformation engine applies.

This is in an embodiment done for plural, and in an embodiment for each, data element (pixel) position in the predicted view orientation transformed frame region that it is desired to generate (for display).

The transformation engine can determine which input frame position should be sampled for a given transformed output frame region data element (e.g. pixel) position in any suitable and desired manner.

In an embodiment, the transformation engine determines for an output transformed frame region data element (pixel) position x, y, the corresponding input frame region position from which the data for that data element (pixel) position in the predicted view orientation transformed output frame region should be (is to be) taken, based on the predicted view orientation transformation that the transformation operation is to apply to that frame region, and one or more of, and in an embodiment all of: a lens distortion correction that the transformation engine is configured to apply to the frame; and a chromatic aberration correction that the transformation operation is configured to apply to the frame.

In an embodiment, the transformation engine determines for an output (display) sampling (pixel) position x, y, a corresponding input frame position (coordinate) (x', y') based on the lens distortion that the transformation operation is configured to take account of, and then modifies that determined frame position (coordinate) (x', y') based on the predicted view orientation (using the interpolated predicted view orientation matrix) for the frame region in question.

In an embodiment the determined input frame position (coordinate) is also modified to take account of chromatic aberration when viewing the output, transformed frame region (to apply a chromatic aberration correction). This is in an embodiment done before modifying the determined input frame position to be sampled based on the predicted view orientation.

Thus, in an embodiment, the transformation engine is configured to (and operates to) when transforming a frame region based on predicted view orientation:

determine for a data element position in the output transformed frame that is to be output, a corresponding position in an input frame based on a defined lens distortion;

modify the determined input frame position to account for chromatic aberration when viewing the output transformed frame to provide at least one modified input frame position; and further modify the determined at least one modified input frame position based on the predicted view orientation (using the interpolated predicted view orientation matrix) for the frame region to provide an output position in the input frame to be sampled to provide data to use for the data element of the output transformed frame region.

In an embodiment, the lens distortion correction and the chromatic aberration correction generates a set of (x, y, z) coordinates to be used for sampling the input frame, with the interpolated predicted view orientation matrix then being applied to those (x, y, z) coordinates to provide a modified set of coordinates (x', y', z'), which modified set of coordinates (x', y', z') is in an embodiment then divided by the z' value to provide the modified x and y coordinates (x'/z', y'/z') that will be used to sample the input frame.

In an embodiment, the chromatic aberration correction operates to apply (and account for) a separate chromatic aberration for each different colour plane. Thus, in an embodiment, the process operates to determine an initial input frame position for an output transformed frame region data element (sampling position) that is being generated based, e.g., and in an embodiment, on the lens distortion (as discussed above), but the chromatic aberration correction stage in an embodiment then determines plural (e.g., and in an embodiment three, one for each colour plane) modified input frame positions (coordinates) (that each account for a respective chromatic aberration).

In this case, the subsequent modification of the input frame position based on the predicted view orientation (using the interpolated matrix) should be, and is in an embodiment, accordingly then respectively applied to each different input frame colour plane position provided by the chromatic aberration correction separately.

In this case therefore there will be (and is in an embodiment) plural (e.g. 3), positions to be sampled in the input frame for a given output transformed frame region sampling position, e.g., and in an embodiment, one input frame position for each different colour plane (colour value) that is to be generated for the output transformed frame region. Thus, for example, the set of RGB colour data for an output transformed frame region data element (sampling position) will in an embodiment comprise a red value determined from one (a "red") input frame position (coordinate), a green value determined from another ("green") input frame position (coordinate), and a blue value determined from a third ("blue") input frame position (coordinate).

Once the position or positions in the input frame whose data is to be used for a data element (sampling position) in an output transformed frame region has been determined, then the input frame is in an embodiment sampled at the determined position or positions, so as to provide the data values to be used for the data element (sampling position) in the output transformed frame region.

This sampling can be performed as desired, for example using bilinear filtering.

Once a frame region (and frame) has been transformed based on the predicted view orientations (and otherwise processed to make it suitable for sending to the display for display), the frame region (and frame) may be, and is in an embodiment, sent to the display for display by the display processor. In an embodiment, the display processor sends the frame regions (frame) directly to the display for display, e.g., and in an embodiment, as a stream of data elements (pixels) for display. The data for the frame regions (frame) may be provided via a wired or wireless connection to the display, as desired.

The display will then operate to display the received frame regions (frame) (e.g., and in an embodiment, in the normal manner of operation for the display in question). Thus, the data elements (pixels) for the frame regions (frame) will be appropriately scanned onto the panel of the display, to display the frame regions (and frame).

In the above arrangements, it would be possible for the transformation engine to determine in the above manner an appropriate position to be sampled in the input frame for each given output transformed frame region position (pixel) (and do this separately for each respective data (e.g. colour) channel).

However, the Applicants have recognised that in practice the input frame positions to be sampled for adjacent and nearby output frame region positions (pixels) (in a colour plane) should only change slowly, such that it would in practice be possible to, rather than explicitly determining an input frame position to be sampled for each output frame region position (pixel), perform such a calculation only for some but not all of the output frame region positions (pixels), and to interpolate the input frame positions to be sampled for those output frame region positions (pixels) for which an input frame position to sample is not specifically calculated.

Thus, in an embodiment, the transformation engine operates to determine (calculate) using the transformation matrix a corresponding position (coordinates) in the input frame to be sampled for only some but not all, and in an embodiment for every Nth, output frame region data element (pixel) position in a frame region to be displayed, and then interpolates the positions (coordinates) to be sampled in the input frame for the output frame region data element (pixel) positions that lie in between the output frame region data element (pixel) positions for which the positions (coordinates) in the input frame have actually been determined.

In this case, N should be an integer greater than 1, and may correspond to, for example, spacings of a few, such as 4-8, output frame region (pixel) positions along the region (e.g. scan line) that is being transformed. The rate at which "true" positions (coordinates) to sample in the input frame will be determined for output frame region (pixel) positions (which will be set by N) could be, for example, and is in an embodiment, set based on the time that it takes to perform that actual determination, so as to, for example, and in an embodiment, match the rate at which the determination can be performed to the period of interpolation.

In an embodiment, the interpolation for intermediate output frame region data element (pixel) positions is done using linear interpolation between the two (closest) output frame region data element (pixel) positions for which the determination is actually being performed that the output frame region data element (pixel) position lies between. The Applicants have recognised in this regard that linear interpolation should be sufficiently accurate for this purpose. However, more sophisticated and/or higher order forms of interpolation, such as quadratic or bicubic interpolation or similar, could be used, if desired.

The Applicants have recognised that in the above arrangements, it would be possible for the resulting input frame position to be sampled for an output frame region data element (pixel) position to lie outside the edges of the input frame that has been produced by the producer processing unit.

When an out of range position is to be sampled, the display processor (e.g. transformation engine) in an embodiment operates to provide some form of default data value (colour) for the output frame region data element (pixel) position in that event. The default data value (colour) that is used in these circumstances could be any suitable and desired value.

For example, there could simply be specified a particular, in an embodiment selected, in an embodiment predetermined, data (colour) value, such as transparent black to use in this situation. This may be appropriate for an input frame (layer) intended to cover only a subset of the display, such as a user interface element.

Additionally or alternatively, the default data (colour) value that is used could be a value that is selected from the input frame itself. Thus, in an embodiment, the data value that is used for an "out of range" input frame sampling position comprises a value that is taken from a valid sampling position within the input frame. This may be particularly applicable for full screen layers. In one embodiment, the data value from the nearest valid input frame sampling position is used. Other more sophisticated techniques, such as mirroring the nearest "valid" input frame positions could also or instead be done if desired.

In an embodiment, the "out of range" replacement strategy can be set and configured in use, e.g., and in an embodiment, by the driver for the display processor, e.g., and in an embodiment, in dependence upon the nature of the input frame that is being processed.

The Applicants have further recognised in this regard, that as well as the determined sampling position in the input frame potentially lying outside the area of the input frame (as discussed above), because of the nature of the re-projection that the transformation matrix performs, that could also shift the input frame in the z ("depth") direction as well. Thus, to avoid input frames (layers) that are transformed to be behind the viewpoint being projected as inverted images, in an embodiment, the z (depth) component that is generated for the position to sample in the input frame after the application of the interpolated transformation matrix (as discussed above) is compared to an arbitrarily small positive quantity (0+6), and when the z component is below that arbitrarily small positive quantity (thereby indicating that the sampling position in question is behind the viewpoint and so should not be displayed), the data value (colour) for the data element (pixel) position in the output frame region is set to (replaced with) a default, particular, in an embodiment selected, in an embodiment predetermined, background colour, such as, and in an embodiment, transparent black.

In this case, any output frame positions (pixels) that are interpolated from an output frame region data element (pixel) position that has been found to be "behind the viewpoint" are in an embodiment also assumed to be behind the viewpoint and so set to the default background colour.

This will then avoid any input frames (layers) that when transformed end up behind the viewpoint being displayed as inverted images.

As discussed above, the final output frame that is displayed may be composited from plural input frames (layers) (each of which will be transformed in the manner of the technology described herein). Such composition may comprise, for example, blending the different input frames (layers) based on associated transparency (alpha) values associated with the frames (layers) (e.g. based upon provided per-layer blend state information to specify how the layers should be blended together and the depth order of the layers). Where such transparency (alpha channel) based blending is to be performed, the display processor in an embodiment blends each data (colour) channel (plane) separately, and so samples respective, separate, transparency (alpha) values for each of the data (colour) channels (planes) (based on the determined input frame sampling position for the data (colour) channel in question). In other words, the display processor in an embodiment treats the input frame (image) as a set of respective colour and alpha channel pairs (e.g. (r, a), (g, a), and (b, a)), and blends each data (colour) channel, based on its corresponding alpha channel, separately. This facilitates taking account of chromatic aberration correction when blending, for example.

It would be possible to perform all the calculations in the technology described herein using floating point values (a floating point representation) for the position coordinates. However, in an embodiment, a fixed point representation is used for the position coordinates in the calculations and operation of the technology described herein. This may allow the calculations to be performed more efficiently.

In an embodiment, a normalised input viewpoint coordinate range $-1 \ldots 1$ is defined, (in an embodiment with $-0.5 \ldots 0.5$ representing the visible area of the viewport.

Correspondingly, the first and second (and any other) predicted view orientation transformation matrices that are provided to the display processor in an embodiment use a (and in an embodiment the corresponding) fixed point representation. In an embodiment the matrices are initially generated using a floating point representation, and then converted to the fixed point representation.

In an embodiment, the (and each) predicted view orientation transformation matrix is in an embodiment also scaled (in an embodiment using a uniform scaling factor) to ensure that the result of any application of the matrix to a coordinate is representable using the fixed point representation (encoding) being used (i.e. such that the application of the matrix will not overflow). The Applicants have recognised in this regard that when using homogeneous matrices, uniform scaling of an N dimension homogeneous matrix will not affect the projected (N-1 dimensional) space, so scaling the matrix uniformly to avoid overflow will not affect the results when the matrix is used. In an embodiment, the (and each) matrix is rescaled by multiplication by the reciprocal of the magnitude of the matrix element having the largest absolute value (magnitude) (i.e. such that all the matrix element values will be in the range $-1$ to $1$ after the scaling).

Such scaling is in an embodiment performed before any conversion of a matrix that uses a floating point representation to the desired fixed point representation (as this will help to preserve precision).

In such arrangements, the first and second (and any other) predicted view orientation transformation matrices that are generated (by the driver) for use for interpolating transformation matrices may also be multiplied, if necessary and desired, by a (suitable) conversion matrix to provide predicted view orientation transformation matrices that are suitable for the range of values that the fixed point representation (encoding) that is being used supports.

This is all in an embodiment done by the driver as part of the predicted view orientation transformation matrix generation process (and should be, and is in an embodiment, done, for each predicted view orientation transformation matrix that the driver generates and provides to the display processor).

The Applicants have recognised that the matrix transformations performed in the technology described herein allow arbitrary changes to the sampling rate when an input image is being displayed. For example, for a quad layer, the image may be rotated such that it appears to be viewed along its edge.

In an embodiment, to allow for this, the producer processing unit is configured to provide the input frames in the form of mipmaps to the display processor driver, with the display processor driver then being operable to select a single mipmap of the provided set of mipmaps to use for the frame (layer) in question (and to provide to the display processor). This can then avoid or reduce the amount of downscaling in the display processor itself, as the driver can provide a mipmap more suited to the sampling rate that will be required. In an embodiment, the driver is operable to determine the bounds on the sampling gradient and then use that to select the mipmap level for the frame to provide to the display processor for display.

Although the technology described herein has been described above with particular reference to the generation and processing of a single frame, as will be appreciated by those skilled in the art, the operation in the manner of the technology described herein is in an embodiment performed for plural frames that are to be displayed, and in an embodiment for each frame of a sequence of plural frames that is to be displayed. Thus, in an embodiment, the operation in the manner of the technology described herein is used to generate a sequence of plural output frames for display to a user, and correspondingly, the operation in the manner of the technology described herein is in an embodiment repeated for plural output frames to be displayed.

Thus, for example, a producer processing unit will produce a sequence of plural output frames to be displayed, with the transformation engine and display processor then processing those frames appropriately to provide them to the display for display.

The generation and processing of the frames for display may also, accordingly, and in an embodiment, comprise generating a sequence of "left" and "right" frames to be displayed to the left and right eyes of the user, respectively. Each pair of "left" and "right" frames for display may be generated from a common input frame, or from respective "left" and "right" input frames, as desired.

In the case where left and right frames are being displayed (such that there will be a left eye "viewport" and a right eye "viewport"), then in an embodiment a pair of predicted view orientation matrices for interpolating between are provided for each of the left and right frames (viewports). Thus there will be a first pair of predicted view orientation transformation matrices provided, e.g. and in an embodiment, for the start and end, of the left eye image (viewport), and a second pair of predicted view orientation matrices provided (e.g. and in an embodiment for the start and end) for the right eye image (viewport).

In this case, it would be possible, and in an embodiment this is done, to provide updated predicted view orientation transformation matrices for the display processor to use for the later (e.g. right eye) image (viewport), to replace the initially prepared predicted view orientation transformation matrices for that image, e.g., and in an embodiment, before that image is displayed (started to be scanned out), e.g., and in an embodiment, in the case where later current view orientation (head pose) information becomes available after the initial generation of the predicted view orientation transformation matrices, but before the image starts to be scanned out. This could be instead of or as well as providing updated matrices or pairs of matrices for use during the actual scanning out of the image in question.

In an embodiment, the display of the technology described herein comprises a head-mounted display, e.g., and in an embodiment, for virtual reality and/or augmented reality display. In this case, the display should, and in an embodiment does, accordingly comprise a display panel for displaying the frames to the user, and a lens or lenses through which the user will view the displayed frames.

Correspondingly, in an embodiment, the display has associated view orientation determining (e.g. head tracking) sensors, which, in an embodiment periodically, generate view tracking information based on the current and/or relative position of the display, and are operable to provide that view orientation periodically to processing units of the data processing system, e.g., in an embodiment, for use when transforming frames based on view orientation.

Thus, another embodiment of the technology described herein comprises a head-mounted display device comprising the data processing system of any one or more of the embodiments of the technology described herein described herein. Correspondingly, another embodiment of the technology described herein comprises a method of operating a head-mounted display device, comprising operating a head-mounted display device in the manner of any one or more of the embodiments of the technology described herein.

As well as the particular units and components required for operation in the manner of the technology described herein, the data processing system may, and in an embodiment does, also comprise one or more of, and in an embodiment all of, any other suitable and desired component, unit, processor, etc., that a data processing system may comprise. Thus the data processing system may comprise one or more of, and in an embodiment all of: a central processing unit, a graphics processing unit, a video processor, an image signal processor, a camera, a system bus, and a memory controller. In an embodiment, the data processing system comprises and/or is in communication with, one or more memories and/or memory devices that store data described herein, and/or software for performing the processes described herein.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, engines, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry), and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry of the technology described herein may be provided as a separate circuit element to any one or more of the other processing stages or processing stage circuitry (circuits), and/or any one or more or all of the processing stages and processing stage circuitry (circuits) may be at least partially formed of shared processing circuitry.

It will also be appreciated by those skilled in the art that all of the described embodiments of the technology described herein can, and in an embodiment do, include, as appropriate, any one or more or all of the features of the technology described herein described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The present embodiments relate to the process of displaying frames to a user in a head-mounted display system, such as for an augmented reality (AR) or virtual reality (VR) display.

Such a system may be configured as shown in FIG. 1 (and described above), with the display 4 of the system comprising an appropriate head-mounted display that includes, inter alia, a display screen or screens (panel or panels) for displaying frames to be viewed to a user wearing the head-mounted display, one or more lenses in the viewing path between the user's eyes and the display screens, and one or more sensors for tracking the pose of the user's head (their head position and/or their view (gaze) direction) in use (while images are being displayed on the display to the user).

Figure 5:
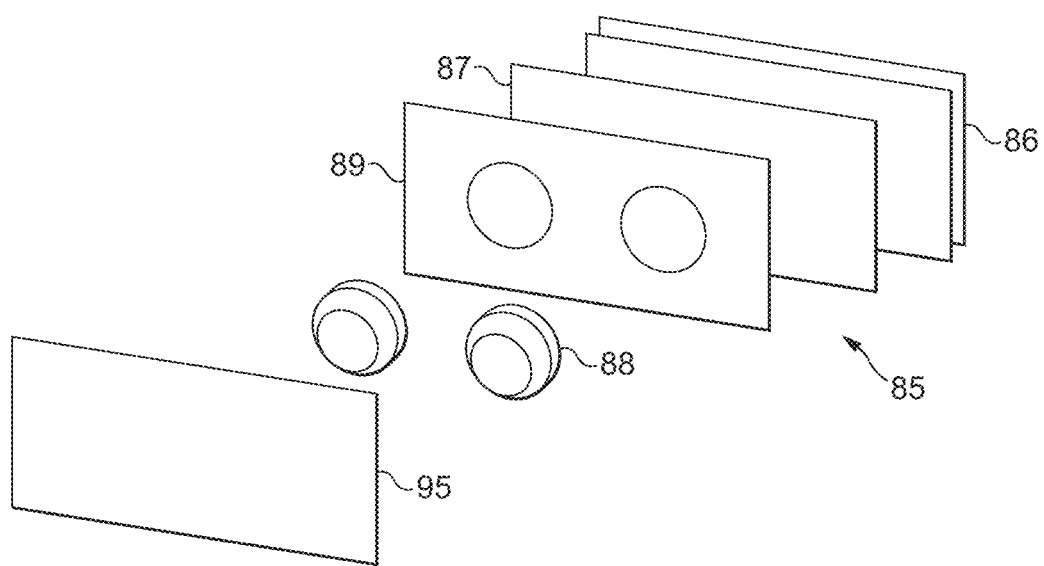
FIG. 5 shows schematically an exemplary virtual reality head mounted display headset.

FIG. 5 shows schematically an exemplary virtual reality head-mounted display 85. As shown in FIG. 5, the head-mounted display 85 comprises, for example, an appropriate display mount 86 that includes one or more head pose tracking sensors, to which a display screen (panel) 87 is mounted. A pair of lenses 88 are mounted in a lens mount 89 in the viewing path of the display screen 87. Finally, there is an appropriate fitting 95 for the user to wear the headset.

In the system shown in FIG. 1, the display processor 5 will operate to provide appropriate images to the display 4 for viewing by the user. The display processor 5 may be coupled to the display 4 in a wired or wireless manner, as desired.

Images to be displayed on the head-mounted display 4 will be, e.g., rendered by the graphics processor (GPU) 2 in response to requests for such rendering from an application 10 executing on a host processor (CPU) 7 of the overall data processing system and store those frames in the main memory 3. The display processor 5 will then read the frames from memory 3 as input surfaces and provide those frames appropriately to the display 4 for display to the user.

In the present embodiments, and in accordance with the technology described herein, the display processor 5 is operable to be able to transform frames based on a predicted view orientation before providing those frames to the display 4 for display to a user.

Figure 6:
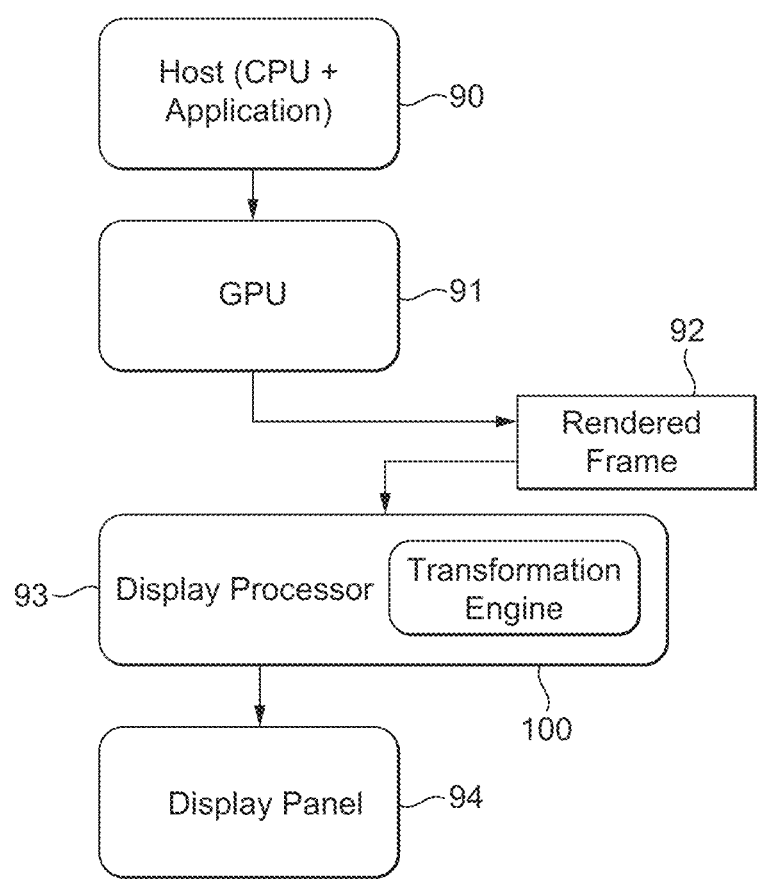
FIG. 6 shows schematically the provision of frames for display in an embodiment of the technology described herein.
Figure 7:
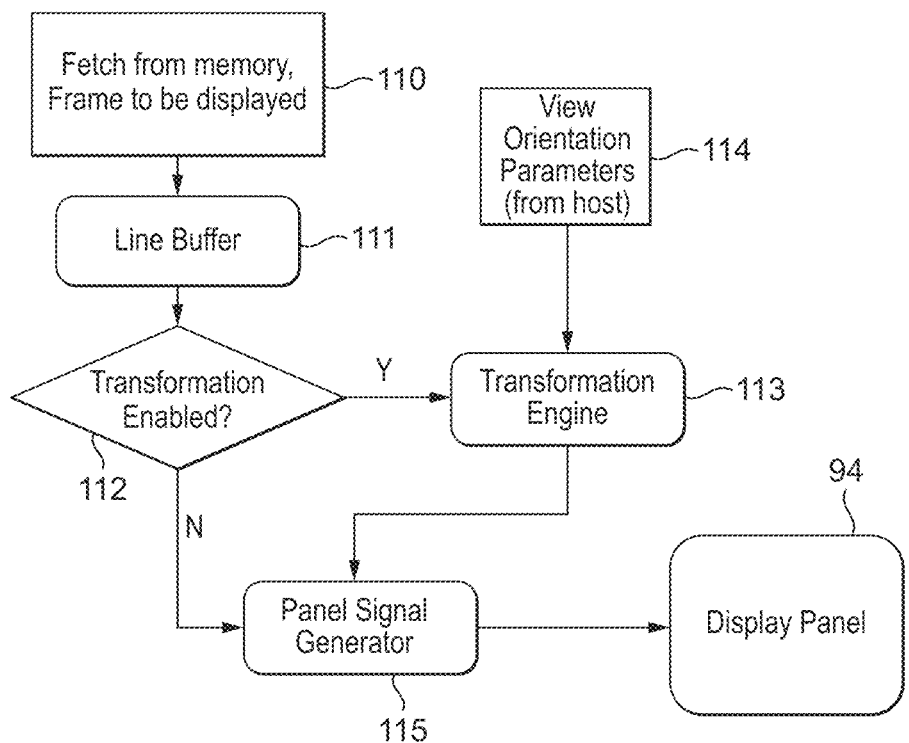
FIG. 7 shows schematically the provision of frames for display in an embodiment of the technology described herein in more detail.

FIGS. 6 and 7 illustrate this.

As shown in FIG. 6, the display processor 93 includes a transformation engine 100 that is operable to transform a rendered frame 92 generated by the graphics processor (GPU) 91 (e.g.) based on view orientation for provision to the display panel 94.

FIG. 7 shows the operation of the display processor when performing the view orientation transformation processing. As shown in FIG. 7, the rendered frame 92 to be displayed is first fetched from the memory (step 110) and then loaded into an appropriate buffer, such as a line buffer, of the display processor 93 (step 111).

It is then determined whether the view orientation transformation processing is enabled (step 112). (If the transformation processing is not enabled, then the loaded input frame is provided to the display 94 for display in the normal manner.)

If the view orientation transformation processing is enabled, then the fetched input frame is processed by a transformation engine of the display processor on the basis of appropriate view orientation parameters 114 provided from the host processor 90, to provide an appropriately "re-projected" version of the frame to be displayed (step 113). The "re-projected" frame is then provided to the remainder of the display processing pipeline (to the panel signal generator 115) for provision to the display 94 for display.

The configuration of the display processor 5 for performing the view orientation transformation operation, and the process of this operation, in the present embodiments, will now be described in more detail.

Figure 2:
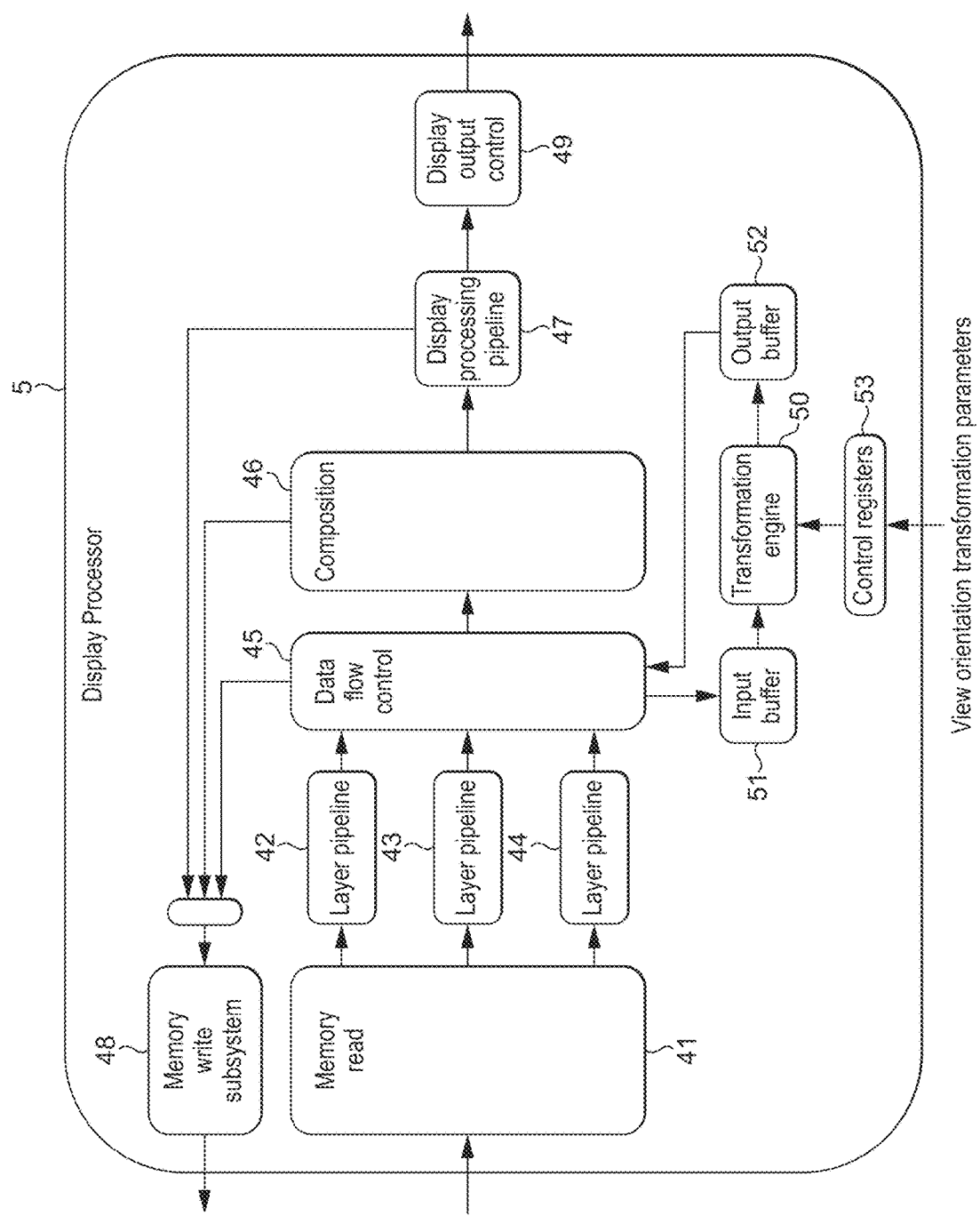
FIG. 2 shows schematically a display processor that can be operated in accordance with an embodiment of the technology described herein.

FIG. 2 shows schematically the display processor 5 in more detail. In FIG. 2, the boxes represent functional units of the display processor, while the arrowed lines represent connections between the various functional units.

As shown in FIG. 2, the display processor 5 comprises a memory read subsystem 41 that includes, inter alia, a read controller in the form of a Direct Memory Access (DMA) read controller. The read controller is configured to read one or more input surfaces from one or more frame buffers in the main memory 3 (not shown in FIG. 2) via the memory bus 9.

The memory read subsystem 41 further comprises one or more real-time FIFO (first-in-first-out) modules which are used to buffer locally the one or more input surfaces as they are read from memory, e.g. for latency hiding purposes.

In this embodiment, the memory read subsystem 41 is configured to provide (read) up to three different input surfaces for use as input layers which are to be used to generate a composited output frame. The three input layers may comprise one or more video layers, e.g. generated by the video processor (codec) 1, and one or more graphics layers, e.g. graphics windows generated by the graphics processing unit (GPU) 2, and so on. Hence, FIG. 2 shows the display processor 5 comprising three layer pipelines 42, 43, 44 which will each receive data from an input surface to be used as a display layer. Any or all of the input surfaces received by the layer pipelines may have been subjected to decoding by a decoder and/or rotation by a rotation unit, if desired.

Each layer pipeline 42, 43, 44 performs appropriate operations on the received surfaces, such as pixel unpacking from the received data words, colour (e.g. YUV to RGB) conversion, and inverse gamma or inverse sRGB correction.

Although the embodiment of FIG. 2 illustrates the use of three layer pipelines (and therefore up to three input layers), it will be appreciated that any number of layer pipelines may be provided and used in the technology described herein, depending on the application in question (and also depending on any silicon area constraints, etc.).

The display processor 5 further comprises a composition unit (display compositor) 46 that can receive inputs from the layer pipelines 42, 43, 44 and operates to compose the received input layers to generate a composited output surface, e.g. by appropriate alpha blending operations, etc.

The composited output frames from the composition unit 46 are onwardly transmitted to a display processing (post-processing) pipeline 47 for display, and/or to a memory write sub-system 48, as desired.

The display pipeline 47 is configured to selectively carry out any desired processing operation(s) on the composited output surface (frame), and to then transmit the (processed) composited output frame for appropriate display on the associated display.

The display processing pipeline 47 may, for example, comprise a colour conversion stage operable to apply a colour conversion to the composited output frame, a dithering stage operable to apply dithering to the composited output frame, and/or a gamma correction stage operable to carry out gamma correction on the composited output frame.

The display processing pipeline 47 also comprises appropriate display timing functionality. Thus, the display processing pipeline 47 is configured to send pixel data to the display outputs 49 with e.g. appropriate horizontal and vertical blanking periods. For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch —before the HSYNC pulse, horizontal back porch—after the HSYNC pulse, vertical front porch—before the VSYNC pulse, and vertical back porch—after the VSYNC pulse).

It would also be possible to use other display timing and data (pixel) packing schemes, such as MIPI DPI, HDMI, Display Port, etc., if desired.

The display output 49 may, e.g. interface with a local display of the data processing system (e.g. of the mobile device, smart phone, tablet, etc., that the data processing system is part of).

The display processing pipeline 47 and display output control interface 49 accordingly act as an output stage for the display processor 5 for providing output frames for display to the display 4.

The memory write subsystem 48 of the display processor 5 is operable to write surfaces, e.g. generated by the composition unit 46, that it receives, out to external memory 3 (a frame buffer in external memory 3) via a memory bus. This then allows the display processor 5 to, as well as providing output frames for display, also write those output frames to main memory, if desired. To facilitate this operation, the memory write subsystem 48 includes a DMA write controller. In the present embodiment it also comprises appropriate FIFOs to act as latency hiding buffers.

The display processor 5 also includes a data flow control module 45 that is operable to direct the data flows through the display processor, i.e. to provide the input layers, composited output surfaces, etc., to the appropriate units for processing as shown in FIG. 2. In the present embodiment, the data flow controller 45 operates under appropriate software control, e.g., and in an embodiment, from a driver 11 for the display controller that is running on a host processor (e.g. the CPU 7) of the overall data processing system that the display processor 5 is part of. The driver may generate appropriate commands for the data flow controller 45 and program control registers of the display processor 5 in response to, e.g., commands and data for display processing received from an application running on the host processor.

Other arrangements in this regard, would, of course, be possible.

As discussed above, when the display processor 5 is to provide an output frame for display, it will read in data of one or more input surfaces (frames) that have been generated, e.g., by video codec 1 and/or GPU 2, and which are stored in respective frame buffers in the main memory 3, to act as input layers in its output frame generation process, process that input surface (frame) data (e.g. by compositing it into an output frame) and provide the (composited) output frame to the display 4 for display via the display processing pipeline 47.

This process is repeated for each frame that needs to be displayed, e.g. at a rate corresponding to the desired frame rate for the display 4.

As shown in FIG. 2, the display processor 5 of the present embodiments further includes a transformation engine 50 that has an associated input buffer 51 and an associated output buffer 52. The transformation engine 50 is operable to transform an input surface (frame) that it receives via the input buffer 51 to provide an appropriately view orientation transformed version of that input surface (frame), which is then provided via the output buffer 52 to the display for display.

The required input surface (frame) data is loaded into the input buffer 51 by the driver controlling the memory read subsystem 41 to read appropriate data for the input surface from the main memory and provide it to the layer pipelines for provision by the data flow control module 45 to the input buffer 51.

As shown in FIG. 2, the data flow control module 45 is operable to direct input surface data processed by the layer pipelines 42, 43 and/or 44 appropriately to the input buffer 51 for processing by the transformation engine 50, and to then direct data from the output buffer 52 appropriately to the composition unit 46 and thence to the display processing pipeline 47 for display. This may again be appropriately controlled and configured by the driver.

The data flow control module 45 can also direct data of the transformed frame to the memory write subsystem 48 for writing out to external memory, if desired. This may be appropriate where subsequent frames for display are generated based on differences with previous frames.

Although the input buffer 51 and output buffer 52 are shown as separate buffers in FIG. 2, those buffers could also be provided via other buffers that may be present in the display processor 5, if desired, such as buffers that may be present in the layer pipelines, for example.

As shown in FIG. 2, the transformation engine 50 also has an associated set of control registers 53 via which appropriate control parameters for the transformation process can be set, e.g., and in an embodiment, under the control of the driver 11. As shown in FIG. 2, the registers receive and store, inter alia, view orientation transformation parameters that are set by the driver for the display processor. Other control parameters, for example indicative of the lenses and/or any other configuration parameters of the head-mounted display, may also be stored in the registers 53 so as to control the operation of the transformation engine 50.

Other arrangements would, of course, be possible.

Figure 3:
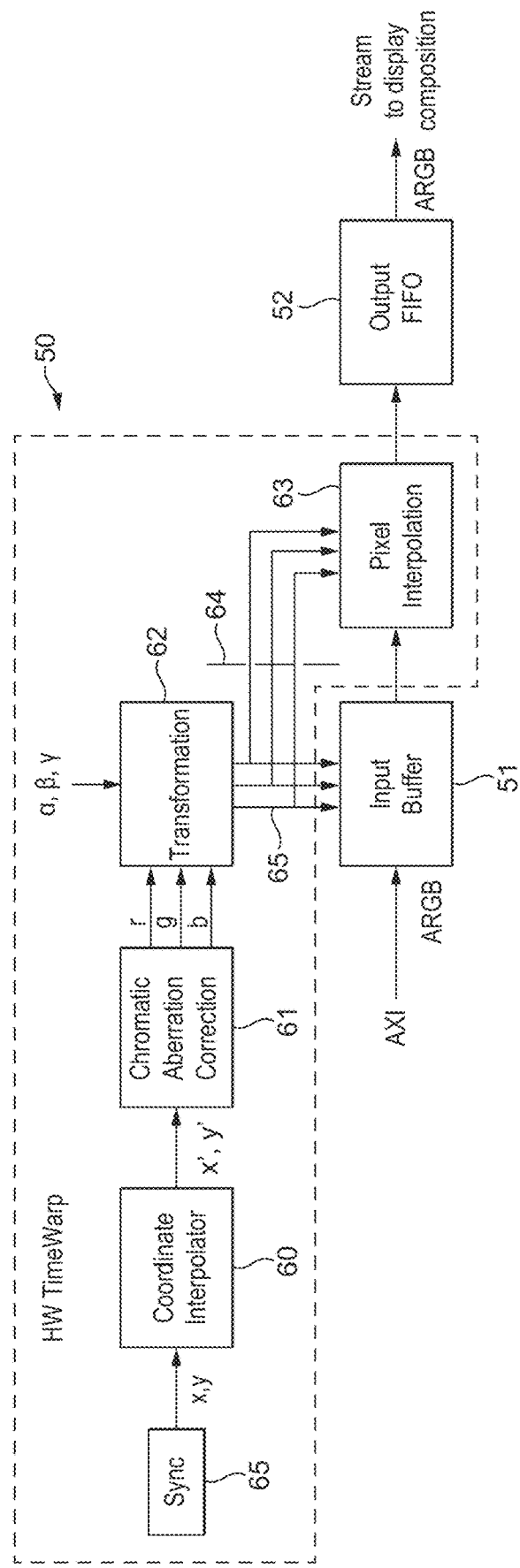
FIG. 3 shows the transformation engine of the display processor of FIG. 4 in more detail.

FIG. 3 shows the transformation engine 50 of the display processor shown in FIG. 2 in more detail.

As shown in FIG. 3, the transformation engine 50 of the display processor comprises a number of stages, namely a coordinate interpolator stage 60, a chromatic aberration correction stage 61, a view orientation transformation stage 62, and an interpolation stage 63. Each of these stages is in the present embodiments implemented in the form of a fixed-function hardware module (processing circuitry) that is configured to perform a particular processing operation on the input data that it receives, but also has some limited configurability by virtue of the ability to vary certain control parameters for each module. The control parameters are in the present embodiment set by the driver 11 for the display processor 5 when a sequence of frames is to be displayed, based on the particular headset (display) 4 that the system is being used with.

Other arrangements would, of course, be possible.

The coordinate interpolator stage 60 operates to determine for a sampling position x, y in the output transformed surface that is to be output from the transformation engine, a corresponding position (coordinate) x', y' in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display.

The coordinate interpolator stage 60 may, for example, execute some form of cubic curve or ellipsoid function for this purpose with, e.g., parameters of that function, such as the focal points of the ellipsoid, being settable by means of control parameters by the driver for the display processor.

Alternatively, three separate distortion meshes that map output coordinates to input coordinates of each of the colour channels could be used for this. For example, a small mesh (32×32) could be used, with the values in between being interpolated using b-spline interpolation. It would also be possible to use bilinear interpolation to interpolate intermediate coordinate values, if desired.

The chromatic aberration correction stage 61, takes the input surface position (coordinates) x', y' determined by the coordinate interpolator stage 60 and "corrects" those coordinates to take account of chromatic aberrations that will be introduced by the lenses of the head-mounted display 4.

As shown in FIG. 3, a separate chromatic aberration correction is performed for each colour plane (R, G, B).

The output of this chromatic aberration correction stage 61 is accordingly three sets of modified input frame positions (coordinates), one set $x_R'$, $y_R'$ for use for sampling the red colour plane in the input frame, one set $x_G'$, $y_G'$ for sampling the green and alpha (transparency) planes in the input frame, and one set $x_B'$, $y_B'$ for sampling the blue plane in the input frame.

In another embodiment, rather than having separate coordinate interpolator 60 and chromatic aberration correction 61 stages, three separate "coordinate interpolator" stages (blocks), one for each colour channel, that also take account of chromatic aberration, could be used to generate the R, G and B colour plane coordinates separately. In this case, rather than having a separate chromatic aberration correction stage 61, the process would simply use three separate coordinate interpolators, one for each colour channel, to generate the appropriate R, G and B coordinates (taking account of chromatic aberration).

The modified input frame positions determined by the chromatic aberration correction stage 61 (or otherwise) are then provided to the view orientation transformation stage 62.

This stage takes as its input a set of transformation parameters that correspond to a predicted view orientation that the input frame is to be rendered as if viewed from for display on the display 4, and operates to generate a projection of the input frame based on (that corresponds to) the predicted view orientation. (This will be discussed in more detail below.)

The view orientation transformation stage 62 accordingly performs a further transformation on each input frame position provided by the chromatic aberration correction stage to thereby provide a set of view orientation transformed input frame positions $(x_R'', y_R'')$, $(x_G'', y_G'')$, $(x_B'', y_B'')$ which will then be used to sample the input frame to derive the colour values to be used for the output transformed frame sampling (data element) position x, y, that is currently being generated.

The transformation that the view orientation transformation stage 62 performs on each input frame position may comprise, for example, a 3D rotation of the 2D plane (image) (a perspective transform/a 2D homography). Again, this can be adjusted in use by the driver setting control parameters for the transformation stage 62 appropriately.

The transformed input frame positions determined by the view orientation transformation stage 62 are provided to an interpolation stage 63, which samples the input frame at the indicated positions to determine the input frame values at those respective input frame positions. This is done by appropriate interpolation of the input frame values for defined input frame sampling (data element) positions.

The interpolation of the input frame sampling position data can be performed in any suitable and desired way. In the present embodiments, bilinear interpolation is used, but other arrangements could be used, if desired.

As different input frame positions (coordinates) are determined for the different colour planes, in the present embodiments a separate set of data is accordingly interpolated for the output transformed frame sampling position (data element) for each colour plane (based on the determined input frame position for that colour plane). Thus, the set of RGB colour data for an output transformed frame sampling position (data element) will comprise a red value determined from the determined "red" input frame position (coordinate) $(x_R'', y_R'')$, a green value determined from the determined "green" input frame position (coordinate) $(x_G'', y_G'')$, and a blue value determined from the determined "blue" input frame position (coordinate) $(x_B'', y_B'')$.

Where an alpha (transparency) value is also to be determined, then that is determined separately for each colour plane, using the respective input frame position (coordinate) that is determined for the colour plane in question.

The interpolated values are then output to the output buffer (FIFO) 52 as shown in FIG. 3, for provision to the remainder of the display processor's display processing pipeline for provision to the display 4 for display to the user.

As shown in FIG. 3, in order that the appropriate input frame data is available for the interpolation stage 63, the modified input surface positions that are determined by the view orientation transformation stage 62 (and that are to be sampled by the interpolation stage 63) are used 65 to control the fetching of the appropriate regions of the input frame containing those sampling positions into the input buffer 51 prior to them being used by the interpolation stage 63.

To do this, the integer parts of the input frame positions determined by the view orientation transformation stage 62 are used to identify the appropriate two-dimensional blocks of the input frame that contain the required input frame data. The input stage then operates to load those respective input frame blocks into the input buffer 51.

As also shown in FIG. 3, to allow for latency between requesting input frame data into the input buffer 51 for use by the interpolation stage 63 and the interpolation stage 63 processing that data to provide an output transformed frame sampling position, there may be an appropriate delay (latency-absorbing) mechanism 64 included in the transformation stage. This can be implemented as desired.

As shown in FIG. 3, the operation of the transformation engine 50 is triggered, and its timing controlled, by receipt of appropriate synchronisation signals 65 from the display 4.

Figure 4:
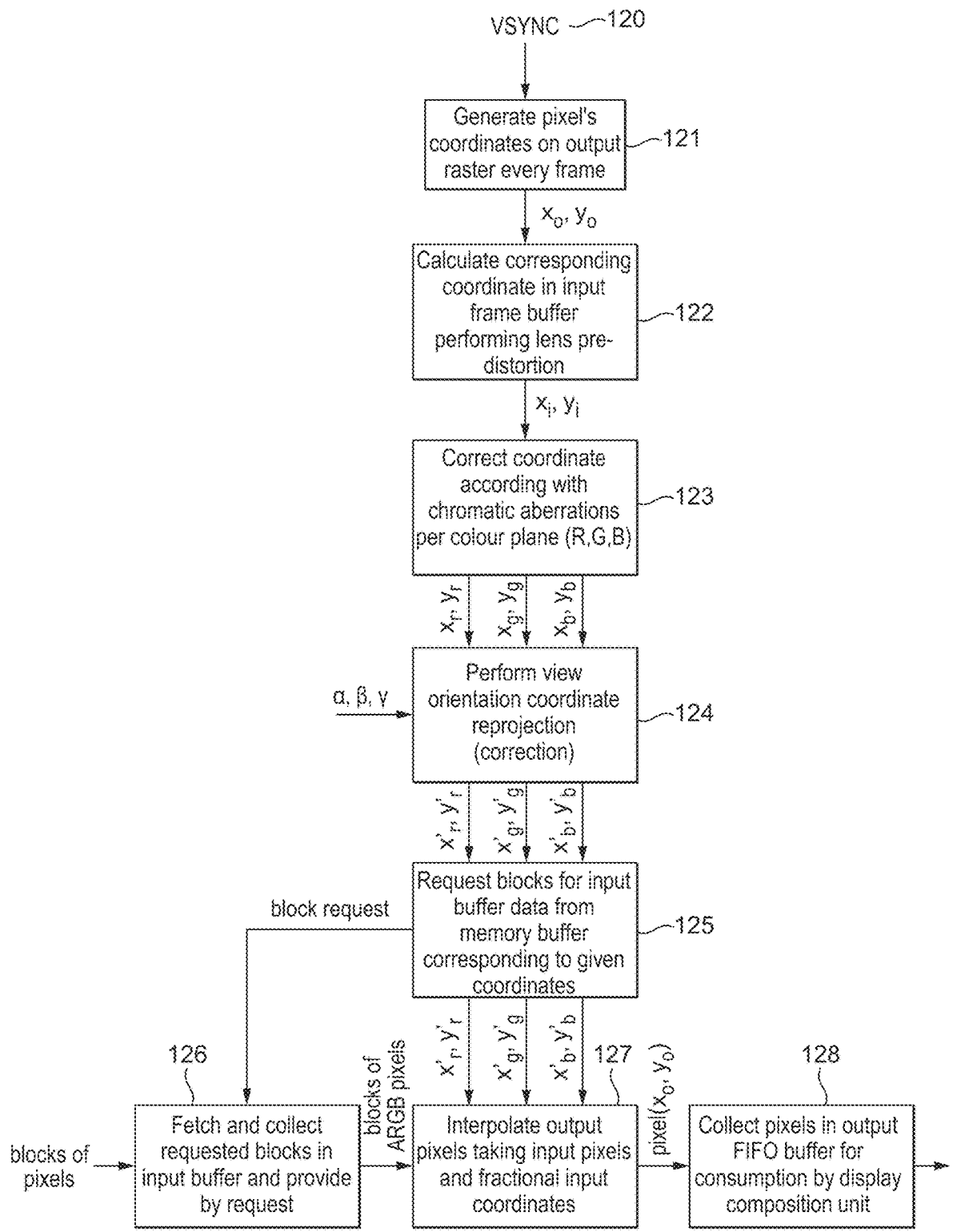
FIG. 4 is a flowchart showing the operation of the transformation engine of the display processor of FIG. 2 in more detail.

FIG. 4 is a flowchart showing the operation of the transformation engine 50 as shown in FIG. 3.

FIG. 4 shows the operation for a respective pixel (data) position in the output transformed frame that is to be generated for display. This operation is repeated for each output transformed frame pixel (data position) that is required.

As shown in FIG. 4, the process starts with an appropriate synchronisation signal 120 indicating the start of a new output frame for display.

The desired output transformed frame pixel coordinates to be generated next, $x_0$, $y_0$, are then determined (step 121).

The coordinate interpolator stage 60 then operates to determine for the pixel (sampling) position $x_0$, $y_0$, in the output transformed frame that is to be output from the transformation engine, a corresponding position (coordinate) $x_i$, $y_i$ in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display (step 122).

The chromatic aberration correction stage 61 then takes the input frame position (coordinates) $x_i$, $y_i$ determined by the coordinate interpolator stage 60 at step 122 and "corrects" those coordinates to take account of chromatic aberrations that will be introduced by the lenses of the display 4 (step 123), to provide the three sets of modified input frame positions (coordinates) $x_r$, $y_r$; $x_{ga}$, $y_{ga}$; $x_b$, $y_b$.

As discussed above, the lens pre-distortion at step 123 and the chromatic aberration correction at step 123 could be performed as a single operation that calculates the corresponding coordinates for each respective colour plane taking account of lens distortion, including chromatic aberration.

The modified input frame positions determined by the chromatic aberration correction stage 61 at step 123 (or otherwise) are then subjected to the "view orientation" coordinate reprojection (correction) by the transformation stage 62 based on the current input set of parameters corresponding to the desired predicted view orientation (step 124) to thereby provide a set of predicted view orientation transformed input frame positions ($x'_r$, $y'_r$), ($x'_{ga}$, $y'_{ga}$), ($x'_b$, $y'_b$).

In an embodiment, the determined lens pre-distorted coordinates are normalised and in the range between −1 to +1, and the view orientation coordinate re-projection (correction) is followed by a "coordinate denormalisation" process that maps the normalised determined lens pre-distorted coordinates to the desired input frame positions (pixel) coordinates.

The so-determined input frame positions are then used, as shown in FIG. 4, to request the fetching of appropriate blocks of the input frame that include the necessary input frame sampling position data into the input buffer to allow the data values for the determined input frame positions to be determined by the interpolation stage 63. This uses the integer part of each determined input frame position to identify which input frame blocks will be required. The identified input frame blocks are then fetched and stored in the input buffer (step 126).

The interpolation stage then reads the appropriate input frame data positions from the input frame blocks stored in the input buffer and interpolates the appropriate data values for the output frame pixel (sampling position) ($x_0$, $y_0$) in question (step 127).

The so-generated output pixels are then collected in the output buffer for subsequent provision to (and consumption by) the display composition unit and provision to the display for display (step 128).

As shown in FIGS. 3 and 4, the transformation engine of the display processor 5 generates the output transformed frame to be displayed to the user as a sequence of sampling positions (pixels) in that output transformed frame (on a sampling position-by-sampling position) (pixel-by-pixel) basis. In the present embodiments, the transformation engine is configured to generate the output transformed frame raster line-by-raster line (e.g. as that is the order in which that output transformed frame will be needed to be provided to the display 4 for display).

The present embodiments relate in particular to the operation of the data processing system when displaying frames on the display 4 which are to be transformed with respect to a predicted view orientation, which may, e.g. be the case where the display is being used to display frames to a user for an augmented reality or virtual reality application, for example.

In the present embodiments, when displaying a frame on the display 4 that is to be transformed with respect to a predicted view orientation, the transformation engine transforms respective regions (and in the present embodiment respective scan lines) of the frame being displayed using a predicted view orientation transformation matrix that has been interpolated from predicted view orientation transformation matrices that have been derived for, in the present embodiments, the start and end of the display of all or part of the frame. (Thus, in the present embodiments, the predicted view orientation parameters that are set by the driver for the display processor and provided to the display processor for use when transforming a frame, comprise respective predicted view orientation transformation matrices.)

Figure 8:
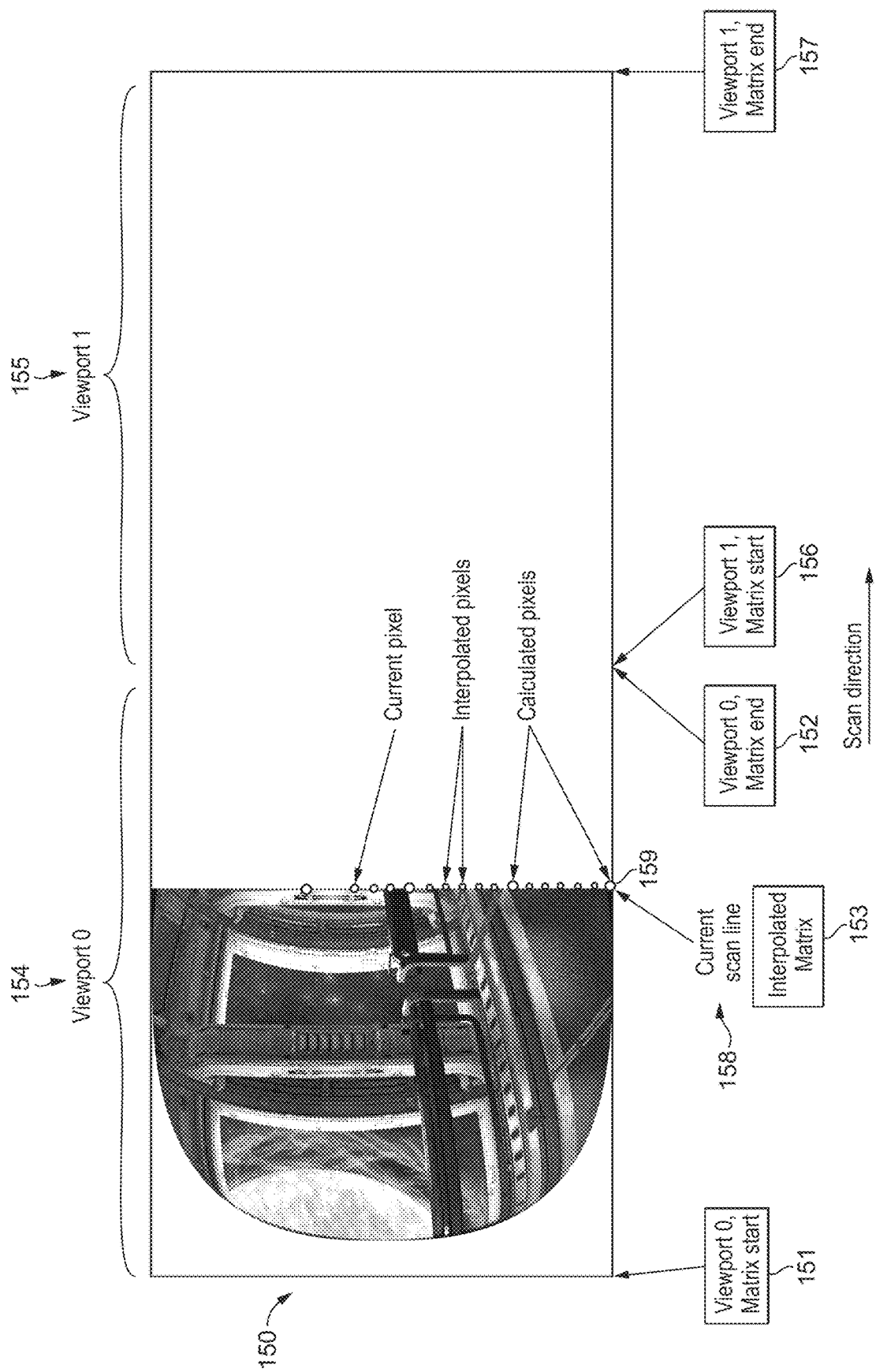
FIG. 8 illustrates an embodiment of the technology described herein.

FIG. 8 illustrates this, and shows the scanning out of a frame 150 for display.

FIG. 8 shows an arrangement where respective left and right images 154, 155 (viewport 0 and viewpoint 1) are being scanned out for display (so as to provide appropriate left and right images for a head mounted display, for example).

As shown in FIG. 8, a respective pair of start and end predicted view orientation transformation matrices 151, 152 are provided for the left image 154, and a corresponding pair of predicted view orientation matrices 156, 157 corresponding to the start and end of the right eye image 155 are provided for use with the right eye image 155.

Then, as shown in FIG. 8, for a scan line 158, a predicted view orientation transformation matrix 153 to use for that scan line is interpolated from the provided respective start and end predicted view orientation transformation matrices 151, 152 for the image (viewport) in question. This interpolated predicted view orientation transformation matrix 153 is then used to perform the predicted view orientation transformations for the scan line 158 in question. This is done for each scan line of the image of the frame.

As is also shown in FIG. 8, the actual transformation calculation using the interpolated transformation matrix 153 is only performed for every Nth pixel 159 in the scan line 158, with the sampling coordinates for any intermediate pixels then being interpolated from the sampling coordinates derived for the calculated pixels that are calculated using the interpolated predicted view orientation transformation matrix.

The present embodiments use fixed-point 3×3 transformation matrices to achieve rotational reprojection of perspective images ("projection layers") and regular 2D images ("Quad layers") into a virtual perspective camera via a homography.

In particular, for perspective images (projection layers), such as stereo images typically rendered by a GPU, the perspective content they contain will be described by the 3D camera and perspective projection used by the 'camera' in each eye. The transformation from 3D scene to 2D perspective image for such an image can be represented by a 4×4 perspective transformation matrix. As the camera and perspective used may not directly match the form factor and optics of the physical headset, the (perspective) view seen by a human eye in the headset can be described by a similar description of the eye's 'camera' relative to a reference origin, and a 4×4 perspective transformation matrix.

Then, using 4×4 homogenous matrix transformations, the application-specified transformation, A, and the desired display transformation, B, both relative to a canonical reference orientation, and a rotational delta between the predicted and actual head pose, can be composed to a transform from display coordinates to image coordinates:

$$\text{image\_coords} = [A.R.\text{inverse}(B)] \cdot \text{display\_coords}$$

The transformation in square brackets is a 4×4 homogeneous perspective matrix that can be reduced to 3×3 by noting that one row and column are redundant and may be collapsed.

For 2D images (quad layers) that do not have an application-specified perspective projection associated with them, then a 2D mapping that places the image on the display as if it was being seen as a 3D surface through a perspective camera needs to be found. In the present embodiments, it is assumed that the application provides an affine transform of a canonical quadrilateral (e.g. a unit square at the origin) to the desired size, orientation and location in 3D space. Using the perspective cameras described by each eye in the headset, a homography that maps from the 2D display plane to the 2D image plane and produces this effect is derived. Homographs of this form are all 3×3 (2D homogeneous) matrices. This homography can be found, e.g., from 4 pairs of point correspondences using a least-squares approach, by a direct mapping that does not require a least-squares fit, etc.

In the present embodiments, the predicted view orientation transformation matrices for the start and end of a frame (or viewport) to be displayed are generated by the driver 11 for the display processor executing on the CPU 7.

The predicted view orientation transformation matrices are determined before the beginning of the display of each frame, but as will be discussed below, they could be updated within the frame in question, if desired.

Figure 9:
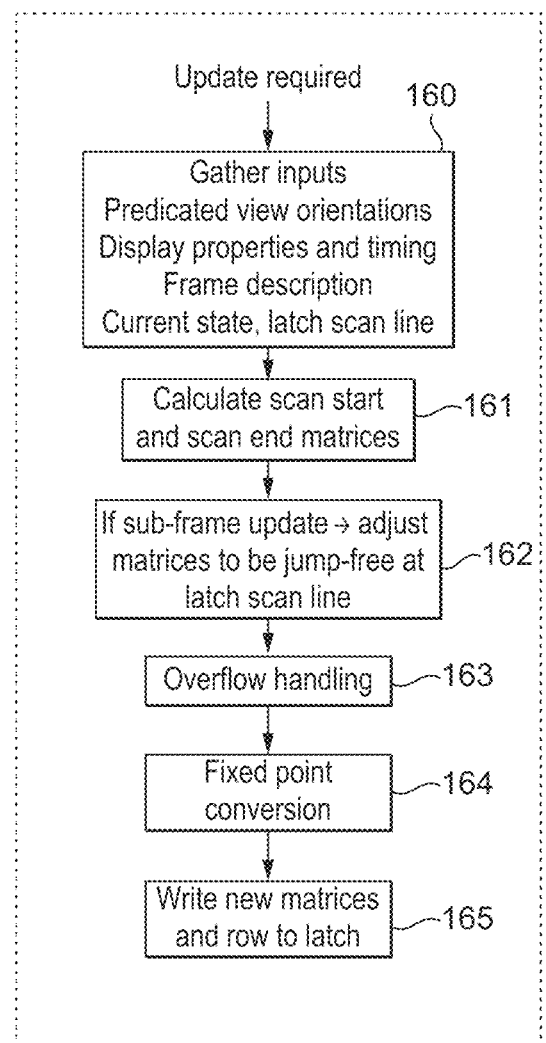
FIG. 9 shows the generation of predicted view orientation transformation matrices in embodiments of the technology described herein.

FIG. 9 illustrates this process.

As shown in FIG. 9, when start and end predicted view orientation transformation matrices are required for a frame, etc., the driver takes as inputs 160, predicted view orientations for the user for the start and end points of the display of the frame, together with other appropriate display parameters, such as related to the display properties and timing, frame description, current state information, etc.

The predicted view orientations for the start and end of a frame are determined in the present embodiments by means of a predicted view orientation determining engine 15 that executes on the CPU 7. This predicted view orientation determining engine uses the latest sensed view orientation (rotation and position) for the display, the time at which the frame being displayed was generated for, the start and end target display times for the frame (i.e. the time when the frame will be displayed), and an estimate of the user's current head motion (e.g. based on tracking of the user's previous head motion), to determine a predicted view orientation for the start and for the end of the frame.

As shown in FIG. 9, the driver then uses these inputs to generate scan start and scan end predicted view transformation matrices for the frame (step 161) (in the manner described above).

The driver can then adjust the so-derived matrices to avoid jumps if the matrices are being used for a sub-frame update (step 162). This will be discussed further below.

The so-derived predicted view orientation matrices are then subjected, if necessary, to a uniform scaling, to avoid the application of the matrices to display coordinates resulting in the data values overflowing (step 163).

This is because, as discussed above, the matrices in the present embodiment, use a fixed point representation, such as 2.30. This can allow the calculation to be performed more efficiently. In particular, normalised input viewpoint coordinates in the range [−1 . . . 1], where [−0.5 . . . 0.5] represents the visible area of the viewport, are defined.

However, if the transformation matrices are initially generated in a floating point format, then it is desirable to ensure the application of the matrix will not result in overflow of the fixed point representation being used. Thus, in the present embodiments, the generated floating point representation matrices are rescaled uniformly to ensure the computation fits within the fixed-point representation and cannot overflow, without affecting the results, by rescaling the matrix such that the largest matrix element is 1/s, where s is the maximum number of accumulations that need to be taken.

The matrices are then subjected to a fixed point conversion operation (step 164) to convert the matrices to the fixed point representation that is being used. (It is assumed in this regard that in the present embodiments the matrices are initially generated in a floating point format, and then converted to the desired fixed point representation.)

The new matrices are then provided to the display processor for use by the transformation engine, together with an indication of the point at which the new matrices should start to be used (the scan line (row) to latch) (step 165).

Once the predicted view orientation transformation matrices for the start and end points of the frame corresponding to the (predicted) head orientation at display scan start and display scan end respectively have been generated and provided to the display processor 5 for use by the transformation engine, the display processor can then use those transformation matrices when transforming the frame based on predicted view orientation for display.

Figure 10:
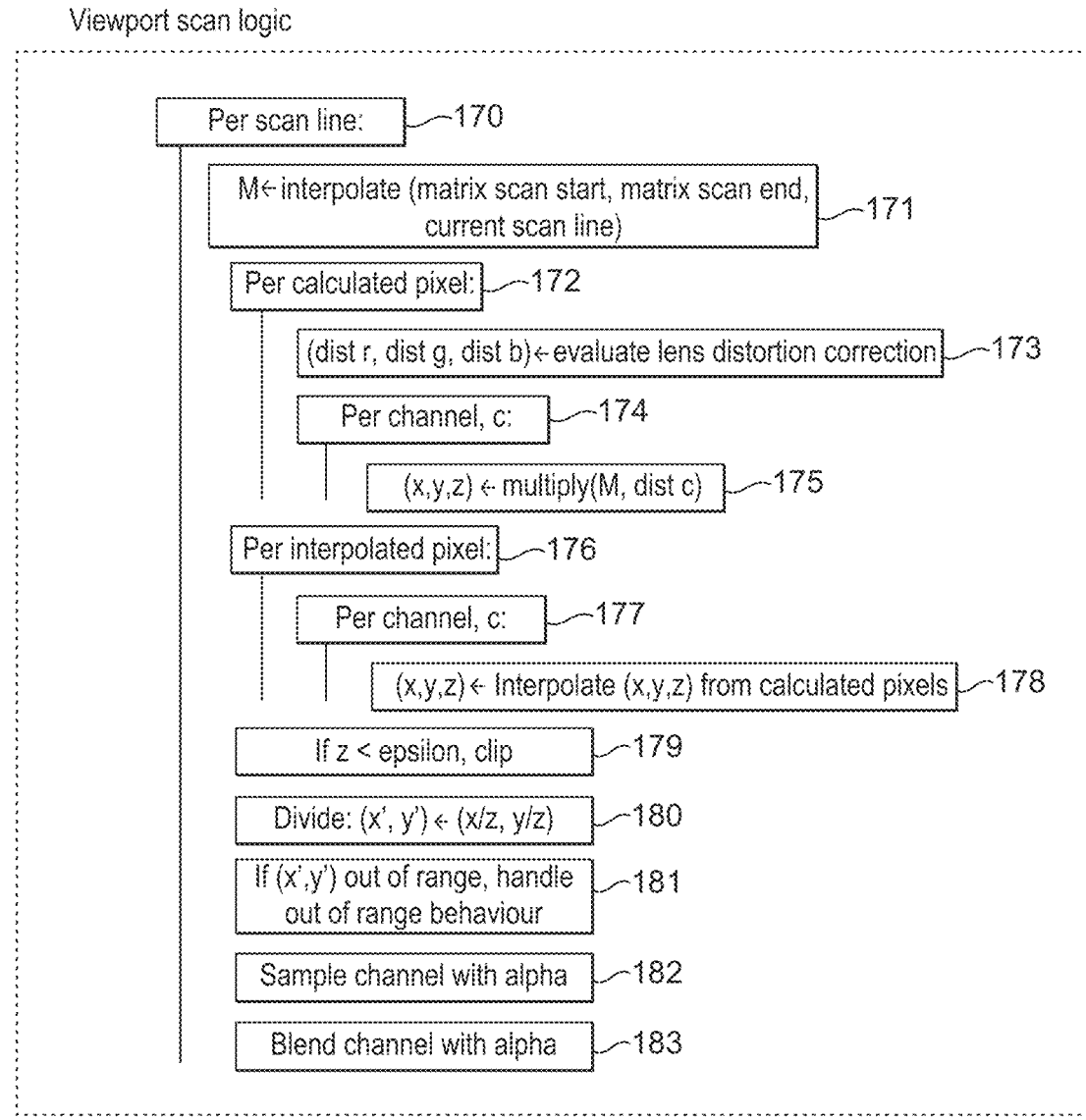
FIG. 10 shows the operation of the display processor when transforming a frame region based on a predicted view orientation in an embodiment of the technology described herein.

FIG. 10 shows this operation of the display processor.

As shown in FIG. 10, and illustrated in FIG. 8, in the present embodiments, a separate predicted view orientation transformation is applied to each scan line of the frame that is displayed (step 170).

Thus, as shown in FIG. 10, when a new scan line is to be started, the transformation engine first determines a predicted view orientation transformation matrix to use for the scan line 158 by interpolating between the first, scan start predicted view orientation transformation matrix 151, and the second, scan end predicted view orientation transformation matrix 152, that were generated and provided by the driver, based on the relative position of the current scan line to the scan start and scan end (step 171).

The present embodiments linearly interpolate between these two matrices based on the current scan line. This reduces the computation to a single matrix (and is equivalent to applying both matrices to each pixel and linearly interpolating between the results).

In the present embodiments, the matrix interpolation is performed in the blanking period at the end of each scan line, using the same hardware that performs the per-pixel matrix multiplication normally.

For each scan line, the provided "M_start" and "M_end" matrices are linearly interpolated to calculate the current scan line's transformation matrix M_row(n):

$$M\_row(n)=L(n)*M\_end+(1-L(n))*M\_start$$

where L(n) is an interpolation factor (weight) corresponding to the relative position of the scan line in question (and is calculated as: L(n)=n*(1/ViewportHeight−1)).

L(n) could be calculated for each scan line, but for a display processor that scans the output lines sequentially, the interpolation factor on each line can be calculated with an incremental scheme, if desired (i.e. such that, on every new line, the interpolation factor is incremented by the reciprocal of the vertical output resolution):

$$L(n+1)=L(n)+(1/ViewportHeight-1).$$

Then, for a pixel in the scan line where the actual input frame coordinates to sample for that pixel are to be calculated (step 172) (as discussed above and shown in FIG. 8, the transformation calculation is only performed in full for every Nth pixel in a scan line), a lens distortion correction, including a chromatic aberration correction, is first determined and applied for the pixel (step 173). This will produce a respective set of coordinates ($x_i$, $y_i$, 1) to sample for each colour channel (dist r, dist g, dist b).

(Thus, each colour channel in a display pixel is described by a 3D homogeneous vector, [$x_i$;$y_i$;1], where xi and yi are the 2d viewport coordinates.)

After this, and as discussed above, each colour channel is then processed separately. Thus, as shown in FIG. 10, for each colour channel (step 174) the coordinates ($x_i$;$y_i$;1) generated by the lens distortion correction (including the chromatic aberration correction) for that colour channel are multiplied by the interpolated predicted view orientation transformation matrix M to give a set of predicted view orientation transformed coordinates ($x_o$; $y_o$; $z_o$) (a 3d vector, [$x_o$; $y_o$; $z_o$], (which will need to be divided through by $z_o$ to project back to 2D)) to be sampled in the input frame for the colour channel in question for the display pixel in question (step 175).

As discussed above, this transformation matrix calculation is only done in the present embodiments every Nth pixel in a scan line, with the sampling positions (coordinates) for the intermediate pixels in the scan line instead being linearly interpolated from the calculated sampling positions (coordinates) for the neighbouring calculated pixels. (This is sufficient because the surface described by the 2d viewport coordinates is slowly changing and so should be well represented by linear interpolation locally.)

This allows the computation for a pixel to be spread across multiple cycles.

Thus, as shown in FIG. 10 for pixels whose sampling positions (coordinates) are to be interpolated 176, for each colour channel (step 177), a set of predicted view orientation transformed coordinates ($x_o$, $y_o$, $z_o$) to be sampled in the input frame for the colour channel in question for the display pixel in question is interpolated from the calculated predicted view orientation transformed coordinates to be sampled in the input frame for the colour channel in question for the neighbouring calculated display pixels (step 178).

This is all done by the transformation engine 50 of the display processor 5.

Once the predicted view orientation transformed coordinates to be sampled in the input frame for a pixel and colour channel have been determined (whether by calculation or interpolation), it is then tested whether the sampling position in question has in fact been transformed to be behind the viewpoint (camera position) (step 179).

As discussed above, after matrix multiplication but before division, a 3D coordinate ($x_o$, $y_o$, $z_o$) that can be considered as relative to camera-like coordinate frame is generated. In the present embodiment, using the convention that the 3rd component, z, denotes "depth", with positive z being in front of the camera, the transformed surfaces are clipped to the camera near plane to avoid layers that end up behind the camera being projected as inverted images.

In the present embodiments, rather than explicitly clipping the frame (layer), pixels are rejected on a per-pixel basis by testing the resulting z component prior to division. If the z-component of the position in the input frame to be sampled after the matrix transformation is below 0+epilson, the pixel and any pixels that would interpolate from it are "clipped", replacing the "sampled" results with transparent black (or equivalent background colour).

The set of coordinates ($x_o$, $y_o$, $z_o$) are then divided by the z coordinate ($z_o$) 70) to project back to the plane coordinates (x', y') for use to sample the input frame region (step 180).

It is then tested whether the coordinates (x', y') to be sampled in the input frame fall outside the area of the input frame (step 181).

The Applicants have recognised in this regard that after projection, the resulting x and y coordinates may also be out of range of the input frame image.

When the coordinates (x', y') to be sampled in the input frame fall outside the area of the input frame, then a default "clipping" operation is performed, depending on the nature of the input frame.

For any layer intended to cover only a subset of the display, such as a UI element, the pixel is clipped (set) to transparent block. For full screen layers, e.g. where seeing some out of range region is considered undesirable and the result of a larger than expected misprediction in head orientation, the pixel is clamped to the nearest valid input frame data element (sampling position) value. Other arrangements would, of course, be possible.

When the coordinates (x', y') to be sampled in the input frame do not fall outside the area of the input frame, then the appropriate colour channel for the input frame is sampled at the determined coordinates, together with the alpha (transparency) value at those coordinates (step 182). The sampled colour value is then, if required, blended in accordance with the sampled alpha value with any other input frames that the input frame is being composited with (step 183). (Thus for alpha (transparency) based blending, the input image is treated as a set of pairs, (r,a), (g, a), (b, a), where the alpha channel has been paired up with each of the 3 colour channels. Each colour channel and it's corresponding alpha channel is then be blended separately.)

The so-transformed (re-projected) pixel coordinates are then used to sample 187 the input image (frame) 188 that is to be displayed, with the sampled pixels then being provided to the appropriate further processing stages of the display processor processing, such as composition and other image processing 189.

The so-transformed and re-projected pixels are then provided to the display pixel output 190 appropriately.

In the arrangement shown in FIG. 8, the start and end predicted view orientation transformation matrices for each viewport are provided before the frame has begun to be scanned out.

However, the applicants have recognised that it could be that more recent sample head pose (tracking) information will become available before or during the scan out of a frame. In this case, the driver in an embodiment operates to provide a new pair of updated predicted view orientation transformation matrices to use for the interpolation process for later scan lines in the frame. This will then allow "sub-frame" updates of the predicted view orientation transformation matrices to be performed.

In this case, as discussed above, when a new pair of predicted view orientation matrices is provided, those matrices are also associated with an indication (a latch_line parameter) to indicate in which output scan line the new pair of matrices should start to be used (are valid). Then, when the display scan out reaches the indicated scan line, the new matrices are latched and used for the matrix interpolation.

To achieve smooth interpolation with such sub-frame matrix updates, the values of the new updated matrices are in an embodiment set to values that will still produce the same interpolated result at the "latch_line" (scan line) where those matrices are to start to be used, as the interpolated result that the previous pair of matrices would produce at that "latch_line". This will help to reduce or avoid any "jump" in the output.

Figure 11:
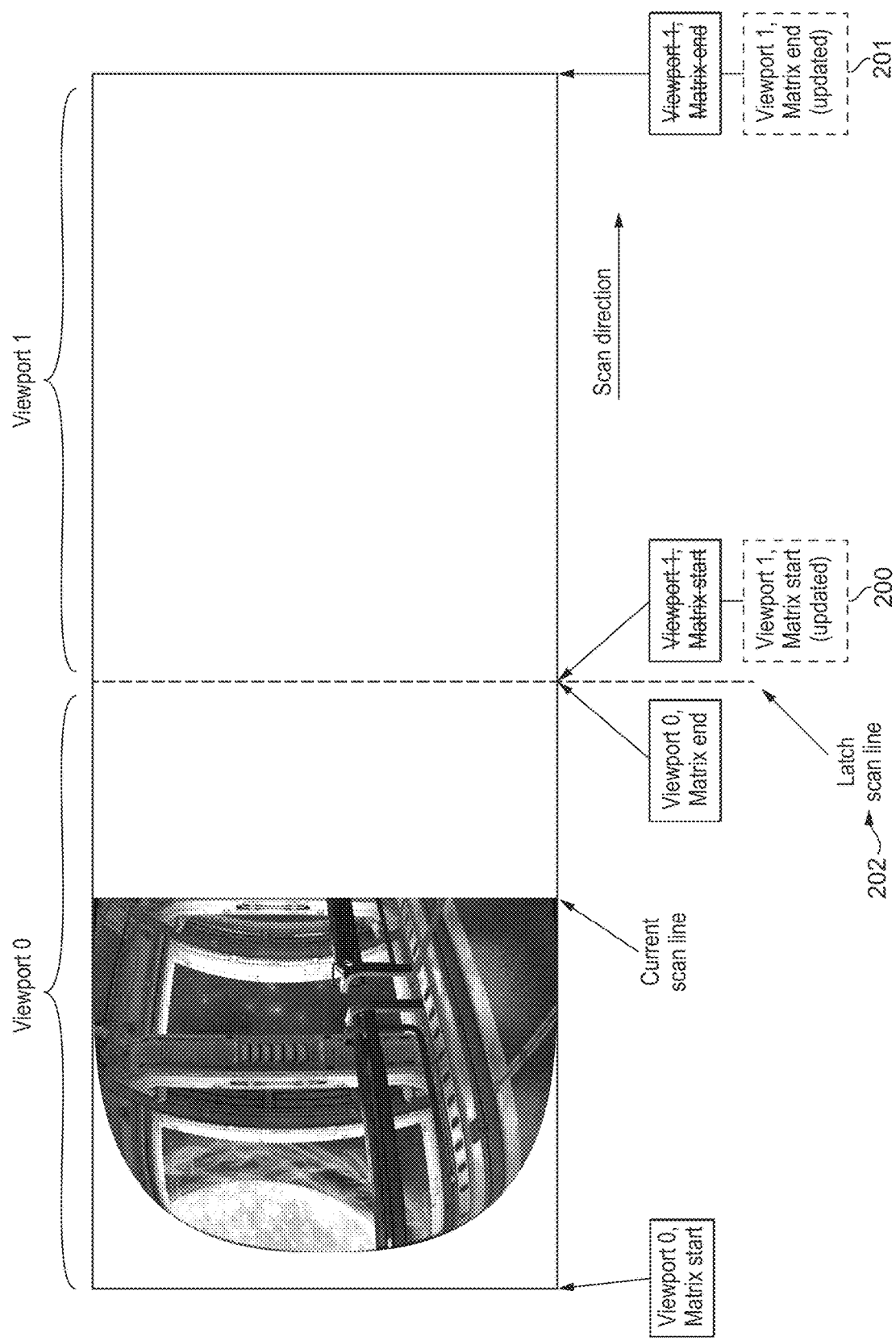
FIG. 11 illustrates a further embodiment of the technology described herein.

FIG. 11 illustrates this, and shows the replacing of the initially provided start and end predicted view orientation transformation matrices 156, 157 for the right high viewport (viewport 1) 155, with a new pair of start and end predicted view orientation transformation matrices 200, 201 for that viewport, to be used from the scan line 202.

It would also be possible to provide new updated predicted view orientation transformation matrices for use within a viewport (at the halfway point of a viewport, for example), if desired.

In the present embodiments, in order to handle arbitrary amounts of minification, images are provided with mipmaps to the driver for the display processor, with the driver then choosing a single mipmap to use for the entire frame based on the expected sampling gradient (the driver in an embodiment computes bounds on the sampling gradient upfront and uses this to pick a suitable mip level (typically floor(log 2(gradient))). In order to do this with respect to a non-linear distortion mesh, the worst-case gradients of the distortion mesh and the frame under its matrix transformation are in an embodiment combined to compute a worst case sampling gradient.

It can be seen from the above that the technology described herein, in its embodiments at least, provides an arrangement that can provide more efficient operation when using head-mounted displays. This is achieved, in the embodiments of the technology described herein at least, by transforming individual regions of frames to be displayed on the display based on their own, separate, predicted view orientations.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system comprising:
   a display operable to display frames for display;
   a producer processing unit operable to generate frames for display on the display;
   a display processor operable to provide frames generated by the producer processing unit to the display for display, the display processor comprising a transformation engine operable to transform a frame generated by the producer processing unit based on a view orientation to provide a view orientation transformed frame for display on the display;
   the method comprising:
   when displaying a frame generated by the producer processing unit that is to be transformed based on a predicted view orientation on the display:
   the transformation engine transforming the frame for display on the display by, for each of plural different regions of the frame:
      determining a predicted view orientation transformation matrix to use to transform the region of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and
      using the interpolated predicted view orientation transformation matrix determined for the region of the frame to transform the region of the frame to provide an output predicted view orientation transformed version of the region of the frame;
      such that each different region of the frame is subjected to a different predicted view orientation transformation to the other regions of the frame for which an interpolated predicted view orientation matrix is determined.

2. The method of claim 1, wherein each different region of the frame comprises a scan line of the frame.

3. The method of claim 1, wherein the first predicted view orientation matrix corresponds to a predicted view orientation for the start of displaying the frame, and the second predicted view orientation matrix corresponds to a predicted view orientation for the end of displaying the frame.

4. The method of claim 1, wherein the predicted view orientation transformation matrices that are used comprise homogeneous 3×3 matrices.

5. The method of claim 1, wherein the data values in the first and second predicted view orientation transformation matrices are represented using a fixed point representation.

6. The method of claim 1, further comprising after initially generating the first and second predicted view orientation transformation matrices, scaling the first and second predicted view orientation transformation matrices using a uniform scaling factor before providing the first and second predicted view orientation transformation matrices to the display processor.

7. The method of claim 1, wherein the transformation matrix to use for a frame region is linearly interpolated from the first and second predicted view orientation matrices in the blanking period at the end of the display of a scan line.

8. The method of claim 1, comprising:
providing to the display processor a first pair of first and second predicted view orientation transformation matrices that are based on a first set of sensed view orientation data for a user, to be used to interpolate predicted view orientation transformation matrices; and
subsequently providing to the display processor one or more further pairs of first and second predicted view orientation transformation matrices to be used to interpolate predicted view orientation transformation matrices instead of the first pair of first and second predicted view orientation transformation matrices during display of the frame, the one or more subsequent pairs of first and second predicted view orientation transformation matrices for interpolating between being based on respective sets of later sensed view orientation data for the user.

9. The method of claim 8, comprising associating with a further pair of first and second predicted view orientation matrices, an indication of when during the display of the frame, that pair of matrices is to start being used.

10. The method of claim 1, comprising the transformation engine, when transforming a frame to be displayed using an interpolated predicted view orientation transformation matrix:
using the transformation matrix to determine for a data element position in the output transformed frame that is to be output, a corresponding position in the frame to be sampled for that data element position in the output transformed frame for each colour plane of the frame.

11. The method of claim 10, comprising using the transformation matrix to determine a corresponding position in the frame to be sampled for some but not all of the data element positions in the output transformed frame region that is being processed; and
interpolating a position in the frame to be sampled for the data element positions in the output transformed frame region for which the transformation matrix is not used to determine a corresponding position to be sampled in the frame.

12. The method of claim 10, wherein the corresponding positions in the frame to be sampled each comprise a set of x, y, z coordinates to be used for sampling the frame; and the method further comprises:
comparing the z coordinate of a determined corresponding position to be sampled to an arbitrarily small positive quantity;
and when the z coordinate is below that arbitrarily small positive quantity, setting the data value for the data element position in the output frame region to a default data value.

13. A data processing system comprising:
a display operable to display frames for display;
a producer processing unit operable to generate frames for display on the display;
a display processor operable to provide frames generated by the producer processing unit to the display for display, the display processor comprising a transformation engine operable to transform a frame generated by the producer processing unit based on a view orientation to provide a view orientation transformed frame for display on the display;
wherein the transformation engine is configured to:
for a frame generated by the producer processing unit to be displayed on the display that is to be transformed based on a predicted view orientation:
for each of plural different regions of the frame:
determine a predicted view orientation transformation matrix to use to transform the region of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and
use the interpolated predicted view orientation transformation matrix determined for the region of the frame to transform the region of the frame to provide an output predicted view orientation transformed version of the region of the frame;
such that each different region of the frame is subjected to a different predicted view orientation transformation to the other regions of the frame for which an interpolated predicted view orientation matrix is determined.

14. The system of claim 13, wherein each different region of the frame comprises a scan line of the frame.

15. The system of claim 13, wherein the first predicted view orientation matrix corresponds to a predicted view orientation for the start of displaying the frame, and the second predicted view orientation matrix corresponds to a predicted view orientation for the end of displaying the frame.

16. The system of claim 13, wherein the predicted view orientation transformation matrices that are used comprise homogeneous 3×3 matrices.

17. The system of claim 13, wherein the data values in the first and second predicted view orientation transformation matrices are represented using a fixed point representation.

18. The system of claim 13, further comprising:
a transformation matrix generating engine operable to generate the first and second predicted view orientation transformation matrices, and to, after initially generating the first and second predicted view orientation transformation matrices, scale the first and second predicted view orientation transformation matrices using a uniform scaling factor before providing the first and second predicted view orientation transformation matrices to the display processor.

19. The system of claim 13, wherein the transformation matrix to use for a frame region is linearly interpolated from the first and second predicted view orientation matrices in the blanking period at the end of the display of a scan line.

20. The system of claim 13, further comprising:
a transformation matrix generating engine operable to:
generate and provide to the display processor a first pair of first and second predicted view orientation transformation matrices that are based on a first set of sensed view orientation data for a user, to be used to interpolate predicted view orientation transformation matrices; and
subsequently provide to the display processor one or more further pairs of first and second predicted view orientation transformation matrices to be used to interpolate predicted view orientation transformation matrices instead of the first pair of first and second predicted view orientation transformation matrices during display of the frame, the one or more subsequent pairs of first and second predicted view orientation transformation matrices for interpolating between being based on respective sets of later sensed view orientation data for the user.

21. The system of claim 20, wherein the transformation matrix generating engine is operable to associate with a further pair of first and second predicted view orientation matrices, an indication of when during the display of the frame, that pair of matrices is to start being used.

22. The system of claim 13, wherein the transformation engine is operable to, when transforming a frame to be displayed using an interpolated predicted view orientation transformation matrix:
use the transformation matrix to determine for a data element position in the output transformed frame that is to be output, a corresponding position in the frame to be sampled for that data element position in the output transformed frame for each colour plane of the frame.

23. The system of claim 22, wherein the transformation engine is operable to:
use the transformation matrix to determine a corresponding position in the frame to be sampled for some but not all of the data element positions in the output transformed frame region that is being processed; and
interpolate a position in the frame to be sampled for the data element positions in the output transformed frame region for which the transformation matrix is not used to determine a corresponding position to be sampled in the frame.

24. The system of claim 22, wherein the corresponding positions in the frame to be sampled each comprise a set of x, y, z coordinates to be used for sampling the frame; and
the display processor further comprises a circuit operable to:
compare the z coordinate of a determined corresponding position to be sampled to an arbitrarily small positive quantity;
and, when the z coordinate is below that arbitrarily small positive quantity, set the data value for the data element position in the output frame region to a default data value.

25. The data processing system of claim 13, wherein the data processing system is part of a head-mounted display device.

26. A non-transitory computer readable storage medium storing computer software code that when executing on at least one processor performs a method of operating a data processing system, the data processing system comprising:
a display operable to display frames for display;
a producer processing unit operable to generate frames for display on the display;
a display processor operable to provide frames generated by the producer processing unit to the display for display, the display processor comprising a transformation engine operable to transform a frame generated by the producer processing unit based on a view orientation to provide a view orientation transformed frame for display on the display;
the method comprising:
when displaying a frame generated by the producer processing unit that is to be transformed based on a predicted view orientation on the display:
the transformation engine transforming the frame for display on the display by, for each of plural different regions of the frame:
determining a predicted view orientation transformation matrix to use to transform the region of the frame by interpolating between a first predicted view orientation matrix that corresponds to a transformation for a predicted view orientation for a first time during the display of the frame and a second predicted view orientation matrix that corresponds to a predicted view orientation for a second, later time during the display of the frame; and
using the interpolated predicted view orientation transformation matrix determined for the region of the frame to transform the region of the frame to provide an output predicted view orientation transformed version of the region of the frame;
such that each different region of the frame is subjected to a different predicted view orientation transformation to the other regions of the frame for which an interpolated predicted view orientation matrix is determined.

* * * * *